US010192495B2

(12) United States Patent
Ikeda et al.

(10) Patent No.: US 10,192,495 B2
(45) Date of Patent: Jan. 29, 2019

(54) DISPLAY APPARATUS WITH LIGHTING DEVICE, CONTROL METHOD FOR DISPLAY APPARATUS, AND STORAGE MEDIUM

(71) Applicant: CANON KABUSHIKI KAISHA, Tokyo (JP)

(72) Inventors: Takeshi Ikeda, Ebina (JP); Takushi Kimura, Kawasaki (JP); Kousei Sugimoto, Atsugi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 15/293,041

(22) Filed: Oct. 13, 2016

(65) Prior Publication Data

US 2017/0110070 A1 Apr. 20, 2017

(30) Foreign Application Priority Data

Oct. 15, 2015 (JP) ................................ 2015-204103
Jul. 28, 2016 (JP) ................................ 2016-148941

(51) Int. Cl.
*G09G 3/34* (2006.01)
*G09G 3/36* (2006.01)
(Continued)

(52) U.S. Cl.
CPC ............. *G09G 3/3426* (2013.01); *G09G 3/36* (2013.01); *G09G 2320/0233* (2013.01); *G09G 2320/0646* (2013.01); *G09G 2340/00* (2013.01)

(58) Field of Classification Search
CPC combination set(s) only.
See application file for complete search history.

(56) References Cited

U.S. PATENT DOCUMENTS 9,711,112 B2 * 7/2017 Ooga ........................ G09G 5/10
2009/0115952 A1 * 5/2009 Nakamura ............. G02B 5/201
349/143

(Continued)

FOREIGN PATENT DOCUMENTS

JP 2014-044302 A 3/2014
WO 2011/013402 A1 2/2011

*Primary Examiner* — Wesner Sajous
(74) *Attorney, Agent, or Firm* — Canon U.S.A., Inc. IP Division

(57) ABSTRACT

A display apparatus includes light-emitting units, a liquid crystal panel, a representative luminance acquisition unit for acquiring luminance values of the light-emitting units, an HPF processing unit for acquiring HPF luminance values of the light-emitting units by increasing the luminance value of a target light-emitting unit, which is greater than that of a neighboring light-emitting unit, according to a difference of the luminance value of the target light-emitting unit and that of the neighboring light-emitting unit, a smoothing processing unit for acquiring correction luminance values of the light-emitting units by increasing the HPF luminance value of a target light-emitting unit, which is smaller than that of a neighboring light-emitting unit, according to a difference of the HPF luminance value of the target light-emitting unit and that of the neighboring light-emitting unit, and a light-emission control unit for controlling light emission of the light-emitting units using the correction luminance values.

28 Claims, 18 Drawing Sheets

(51) Int. Cl.

| | |
|---|---|
| ***H04N 1/60*** | (2006.01) |
| ***H04N 5/57*** | (2006.01) |
| ***H04N 9/64*** | (2006.01) |
| ***H04N 9/73*** | (2006.01) |

(56) References Cited

U.S. PATENT DOCUMENTS

2010/0321414 A1* 12/2010 Muroi .................. G09G 3/3413
345/690
2013/0093802 A1* 4/2013 Tanaka ................... G09G 3/003
345/690
2013/0314459 A1* 11/2013 Nakanishi ............ G09G 3/3406
345/694
2014/0225943 A1* 8/2014 Shiobara .............. G09G 3/3413
345/694
2015/0009246 A1* 1/2015 Watanabe ............ G09G 3/2092
345/690
2015/0348506 A1* 12/2015 Ooga ....................... G09G 5/10
345/205
2017/0154583 A1* 6/2017 de Greef .............. G09G 3/3406

* cited by examiner

FIG. 6

8

| | A | B | C | D | E | F | G | H | I | J |
|---|---|---|---|---|---|---|---|---|---|---|
| 1 | 16 | 16 | 16 | 16 | 16 | 16 | 16 | 255 | 255 | 255 |
| 2 | 16 | 16 | 16 | 16 | 16 | 16 | 255 | 255 | 255 | 255 |
| 3 | 16 | 16 | 16 | 16 | 16 | 16 | 255 | 255 | 255 | 255 |
| 4 | 16 | 255 | 16 | 16 | 16 | 16 | 255 | 255 | 255 | 255 |
| 5 | 16 | 16 | 16 | 16 | 16 | 16 | 255 | 255 | 255 | 255 |
| 6 | 16 | 16 | 16 | 16 | 16 | 16 | 255 | 255 | 255 | 255 |
| 7 | 16 | 16 | 16 | 16 | 16 | 16 | 16 | 255 | 255 | 255 |

FIG. 7

8

| | A | B | C | D | E | F | G | H | I | J |
|---|---|---|---|---|---|---|---|---|---|---|
| 1 | 13 | 13 | 13 | 13 | 13 | 13 | 13 | 50 | 50 | 50 |
| 2 | 13 | 13 | 13 | 13 | 13 | 13 | 50 | 50 | 50 | 50 |
| 3 | 13 | 13 | 13 | 13 | 13 | 13 | 50 | 50 | 50 | 50 |
| 4 | 13 | 50 | 13 | 13 | 13 | 13 | 50 | 50 | 50 | 50 |
| 5 | 13 | 13 | 13 | 13 | 13 | 13 | 50 | 50 | 50 | 50 |
| 6 | 13 | 13 | 13 | 13 | 13 | 13 | 50 | 50 | 50 | 50 |
| 7 | 13 | 13 | 13 | 13 | 13 | 13 | 13 | 50 | 50 | 50 |

FIG. 8

8

| | A | B | C | D | E | F | G | H | I | J |
|---|---|---|---|---|---|---|---|---|---|---|
| 1 | 13 | 13 | 13 | 13 | 13 | 12 | 5 | 54 | 52 | 50 |
| 2 | 13 | 11 | 13 | 13 | 11 | 9 | 58 | 51 | 50 | 50 |
| 3 | 13 | 10 | 13 | 13 | 11 | 9 | 55 | 51 | 50 | 50 |
| 4 | 10 | 66 | 10 | 11 | 12 | 9 | 54 | 51 | 50 | 50 |
| 5 | 13 | 10 | 13 | 13 | 11 | 9 | 55 | 51 | 50 | 50 |
| 6 | 13 | 11 | 13 | 13 | 11 | 9 | 58 | 51 | 50 | 50 |
| 7 | 13 | 13 | 13 | 13 | 13 | 12 | 5 | 54 | 52 | 50 |

FIG. 9

8

| | A | B | C | D | E | F | G | H | I | J |
|---|---|---|---|---|---|---|---|---|---|---|
| 1 | 13 | 14 | 13 | 13 | 14 | 21 | 40 | 54 | 53 | 52 |
| 2 | 14 | 24 | 14 | 14 | 21 | 41 | 58 | 56 | 53 | 51 |
| 3 | 24 | 47 | 24 | 14 | 20 | 40 | 57 | 54 | 52 | 50 |
| 4 | 47 | 66 | 47 | 24 | 20 | 39 | 56 | 54 | 52 | 50 |
| 5 | 24 | 47 | 24 | 14 | 20 | 40 | 57 | 54 | 52 | 50 |
| 6 | 14 | 24 | 14 | 14 | 21 | 41 | 58 | 56 | 53 | 51 |
| 7 | 13 | 14 | 13 | 13 | 14 | 21 | 40 | 54 | 53 | 52 |

DISPLAY APPARATUS WITH LIGHTING DEVICE, CONTROL METHOD FOR DISPLAY APPARATUS, AND STORAGE MEDIUM

BACKGROUND OF THE INVENTION

Field of the Invention

Aspects of the present invention relate to a display apparatus including a lighting device, a method for controlling the display apparatus, and a storage medium.

Description of the Related Art

A display apparatus including a transmission-type display panel and a backlight can display an image with transmitted light emitted from the backlight toward the display panel. There is a conventional technique capable of controlling the luminance (emission luminance) of light emitted from each light-emitting unit according to the brightness of an image displayed in a partial region of the display panel corresponding to each light-emitting unit, in a case where a display apparatus includes a plurality of light-emitting units respectively including a backlight whose emission luminance is independently controllable.

In the above-mentioned display apparatus, a part of the light emitted from the light-emitting unit diffuses into a peripheral region neighboring the partial region of the display panel corresponding to the light-emitting unit. Accordingly, in a case where the above-mentioned display apparatus displays an image including a locally brighter portion compared to a peripheral image, a part of the light emitted from the light-emitting unit diffuses at a portion corresponding to the region where the bright image is displayed. In this case, the luminance to express the bright image cannot be obtained satisfactorily.

As discussed in International Publication No. 2011/013402, there is a conventional technique capable of increasing the emission luminance of a peripheral light-emitting unit neighboring a concerned light-emitting unit, which is one of a plurality of light-emitting units constituting a backlight, in a case where an input image corresponded to the concerned light-emitting unit includes a pixel having a higher gradation value. According to the above-mentioned technique, in a case where the image to be displayed is an image having a locally brighter portion, it is feasible to compensate the attenuated luminance of light emitted to a partial region of a display panel where the bright image is displayed with light emission of the neighboring light-emitting unit.

SUMMARY OF THE INVENTION

According to an aspect of the present invention, a display apparatus includes a plurality of light-emitting units configured to emit light, a display unit configured to display an image on a screen with transmitted light emitted based on an input image, a first acquisition unit configured to acquire initial luminance values of the plurality of light-emitting units based on the luminance of each of a plurality of regions of the input image corresponding to each of the plurality of light-emitting units, a first processing unit configured to acquire intermediate luminance values of the plurality of light-emitting units by correcting the initial luminance values of the plurality of light-emitting units, a second processing unit configured to acquire correct luminance values of the plurality of light-emitting units by correcting the intermediate luminance values of the plurality of light-emitting units and, a control unit configured to control light emission of each of the plurality of light-emitting units according to the correct luminance value of each of the plurality of light-emitting units, wherein, in a case where the initial luminance value of a first target light-emitting unit among the plurality of light-emitting units is greater than the initial luminance value of the first neighboring light-emitting unit neighboring the first target light-emitting unit, the first processing unit corrects by increasing the initial luminance value of a first target light-emitting unit according to a difference of the initial luminance value of a first target light-emitting unit and the initial luminance value of the first neighboring light-emitting unit, wherein, in a case where the intermediate luminance value of a second target light-emitting unit among the plurality of light-emitting units is smaller than the intermediate luminance value of the second neighboring light-emitting unit neighboring the second target light-emitting unit, the second processing unit corrects by increasing the intermediate luminance value of a second target light-emitting unit according to a difference of the intermediate luminance value of a second target light-emitting unit and the intermediate luminance value of the second neighboring light-emitting unit.

Further features of the aspects of the present invention will become apparent from the following description of exemplary embodiments with reference to the attached drawings.

BRIEF DESCRIPTION OF THE DRAWINGS

FIG. 6 schematically illustrates representative luminance values of input image regions corresponding to respective light-emitting units of the backlight.

FIG. 7 schematically illustrates emission luminance values corresponding to respective light-emitting units of the backlight, which have been acquired by a luminance value acquisition unit.

FIG. 8 schematically illustrates high-pass filter (HPF) emission luminance values corresponding to respective light-emitting units of the backlight, which have been acquired by an HPF processing unit.

FIG. 9 schematically illustrates correction emission luminance values corresponding to respective light-emitting units of the backlight, which have been acquired by a smoothing processing unit.

DESCRIPTION OF THE EMBODIMENTS

Hereinbelow, exemplary embodiments of the aspects of the present invention will be described in detail with reference to attached drawings. The technical scope of the aspects of the present invention is defined by the claims and should not be limited by the following exemplary embodiments. Further, the aspects of the present invention do not require all combinations of characteristic features described in the exemplary embodiments. The following description and drawings are mere examples and should not be construed to narrowly limit the aspects of the present invention. The exemplary embodiments can be modified in various ways within the scope of the aspects of the present invention. The aspects of the present invention do not exclude such modifications of respective exemplary embodiments.

Figure 1:
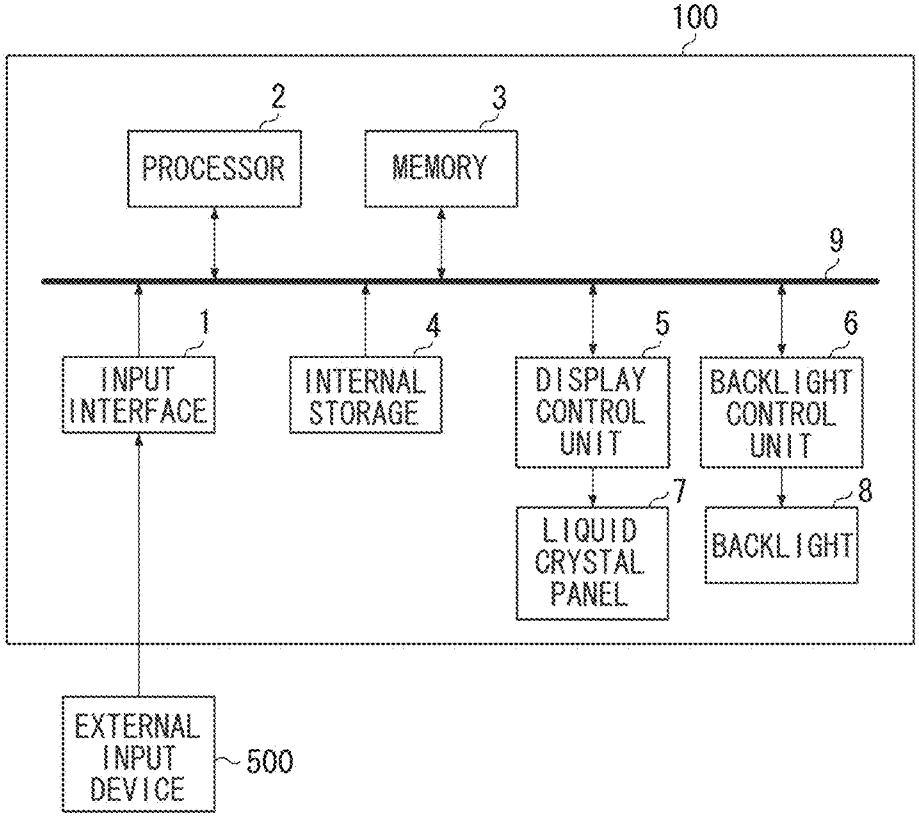
FIG. 1 is a block diagram illustrating a configuration of a display apparatus according to a first exemplary embodiment.

FIG. 1 illustrates a configuration of a display apparatus 100 according to a first exemplary embodiment. The display apparatus 100 includes an input interface 1, a processor 2, a memory 3, an internal storage 4, a display control unit 5, a backlight control unit 6, a liquid crystal panel 7, a backlight 8, and a bus line 9.

The input interface 1 is an interface that connects the display apparatus 100 and an external input device 500. The input interface 1 can output an image input from the external input device 500 to the processor 2 and the memory 3 via the bus line 9.

The input interface 1 is an input port that conforms to Digital Visual Interface (DVI) or High-Definition Multimedia Interface (HDMI (registered trademark)) standards. Further, the input interface 1 can be a receiving interface capable of receiving signals that conform to wireless communication standards, e.g., Wireless Fidelity (Wi-Fi) and Bluetooth (registered trademark) standards. Further, the input interface 1 has a function for converting an input or received signal into an appropriate signal that can be processed by the processor 2, the display control unit 5, and the backlight control unit 6.

In the present exemplary embodiment, the external input device 500 is connected to the input interface 1 of the display apparatus 100 and is capable of output images. More specifically, the external input device 500 may be an imaging apparatus (e.g., a camera) that can output captured images or a storage medium equipped device (e.g., a recorder or a personal computer (PC)) that can store images and can output the stored images.

The processor 2 is a processing apparatus that can control operations of the display apparatus 100. The processor 2 is an arithmetic processing apparatus, such as a central processing unit (CPU) or a micro processing unit (MPU). In this case, the processor 2 executes programs read from the memory 3 to control operations of the display control unit 5 and the backlight control unit 6.

The processor 2 can perform processing similar to a part or the whole of the below-described functions of the display control unit 5 and the backlight control unit 6 by executing the programs read from the memory 3. Further, the processor 2 can read images from the internal storage 4 and output the images to the display control unit 5 and the backlight control unit 6 by executing the programs read from the memory 3. As a modified embodiment, the display apparatus 100 can be configured to include a plurality of processors.

The memory 3 is a storage medium from which data can be read or to which data can be written. The memory 3 can store programs and parameters that the processor 2 can execute or process when the processor 2 controls the display apparatus 100. The memory 3 is a nonvolatile storage medium (e.g., a hard disk drive) or a volatile storage medium (e.g., a semiconductor memory).

The internal storage 4 is a storage medium (e.g., a hard disk drive). The internal storage 4 can store images to be displayed by the display apparatus 100 and can output the images to the processor 2 and the memory 3 via the bus line 9. Further, the internal storage 4 may store programs to be used when the processor 2 controls the display apparatus 100.

The display control unit 5 is a control circuit substrate that can control the liquid crystal panel 7 based on the input image. The display control unit 5 can perform image processing on at least a part of the input image to generate a display image and can control a plurality of liquid crystal elements of the liquid crystal panel 7 based on the display image. Further, to perform the above-mentioned processing, the display control unit 5 includes a plurality of circuit modules that can realize functions of respective functional blocks described below. The circuit modules can realize respective functions thereof. As a modified embodiment, the display control unit 5 may be configured to include an arithmetic processing apparatus (i.e., a computer) that can execute programs capable of realizing at least one of the functions of the functional blocks described below.

The backlight control unit 6 is a control circuit substrate that can control the backlight 8 based on the input image. More specifically, the backlight control unit 6 determines a luminance setting value indicating a light-emission amount of the backlight 8 according to the luminance of the input image and determines a signal to control the backlight 8 based on the determined emission luminance. Further, the backlight control unit 6 includes a plurality of circuit modules as described below to perform the above-mentioned processing. The circuit modules can realize respective functions thereof.

The liquid crystal panel 7 is a transmission-type display panel that includes a plurality of liquid crystal elements, the light transmittance of which can be controlled independently. The display control unit 5 controls the liquid crystal panel 7 in such a way as to determine the transmittance of each liquid crystal element according to the input image and display an image on a screen disposed on the front side of the liquid crystal panel 7 with transmitted light emitted from the backlight 8.

Each liquid crystal element of the liquid crystal panel 7 can change its transmittance according to a gradation value of a corresponding pixel of the input image. In the first exemplary embodiment, the transmittance of the liquid crystal element linearly increases when the gradation value increases. In one embodiment, the liquid crystal panel 7 is a transmission-type display panel. For example, the liquid crystal panel 7 may be a display panel including a plurality of shutter elements using Micro Electro Mechanical Systems (MEMS).

The backlight 8 is a lighting device including a plurality of light-emitting units. The backlight 8 is disposed on a backside of the liquid crystal panel 7. Each of the plurality of light-emitting units can emit light toward the liquid crystal panel 7. Each light-emitting unit includes light sources 8*a* and can control lighting of the light-emitting unit. In other words, the backlight 8 is a lighting device constituted by a plurality of light-emitting units, the emission luminance of which can be controlled independently. The backlight control unit 6 can control each light-emitting unit of the backlight 8 with reference to the luminance setting value determined based on the input image.

Figure 2:
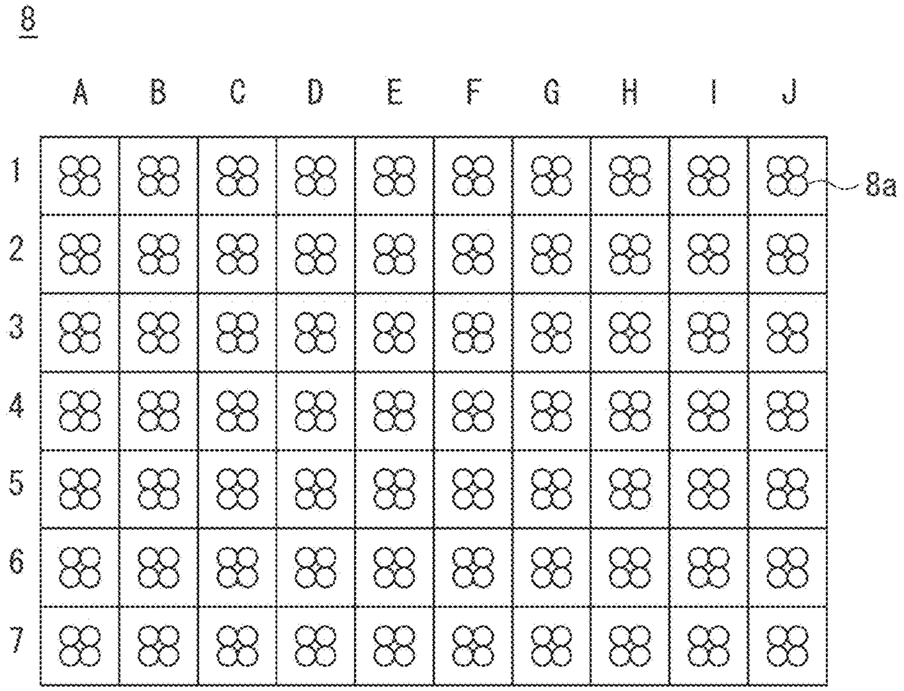
FIG. 2 schematically illustrates a backlight according to the first exemplary embodiment.

FIG. 2 schematically illustrates the backlight 8 according to the first exemplary embodiment. The backlight 8 includes a plurality of light-emitting units disposed in a matrix pattern, which is composed of seven (1 to 7) light-emitting units in the vertical direction and ten (A to J) light-emitting units in the horizontal direction, relative to the screen of the display apparatus 100. Respective light-emitting units can be discriminated and expressed with reference to the position (e.g., A to J) in the horizontal direction and the position (e.g., 1 to 7) in the vertical direction. For example, the light-emitting unit positioned at an upper right position in FIG. 2 is referred to as light-emitting unit J7. The total number of light-emitting units included in the backlight 8 and the layout thereof are not limited to the above-mentioned configuration. A designer can arbitrarily set the size and functions of the display apparatus 100.

The bus line 9 is a shared communication line that connects the input interface 1, the processor 2, the memory 3, the internal storage 4, the display control unit 5, and the backlight control unit 6. Various kinds of information, including input images and programs to be used by the processor 2, can be transmitted and received via the bus line 9.

Figure 3:
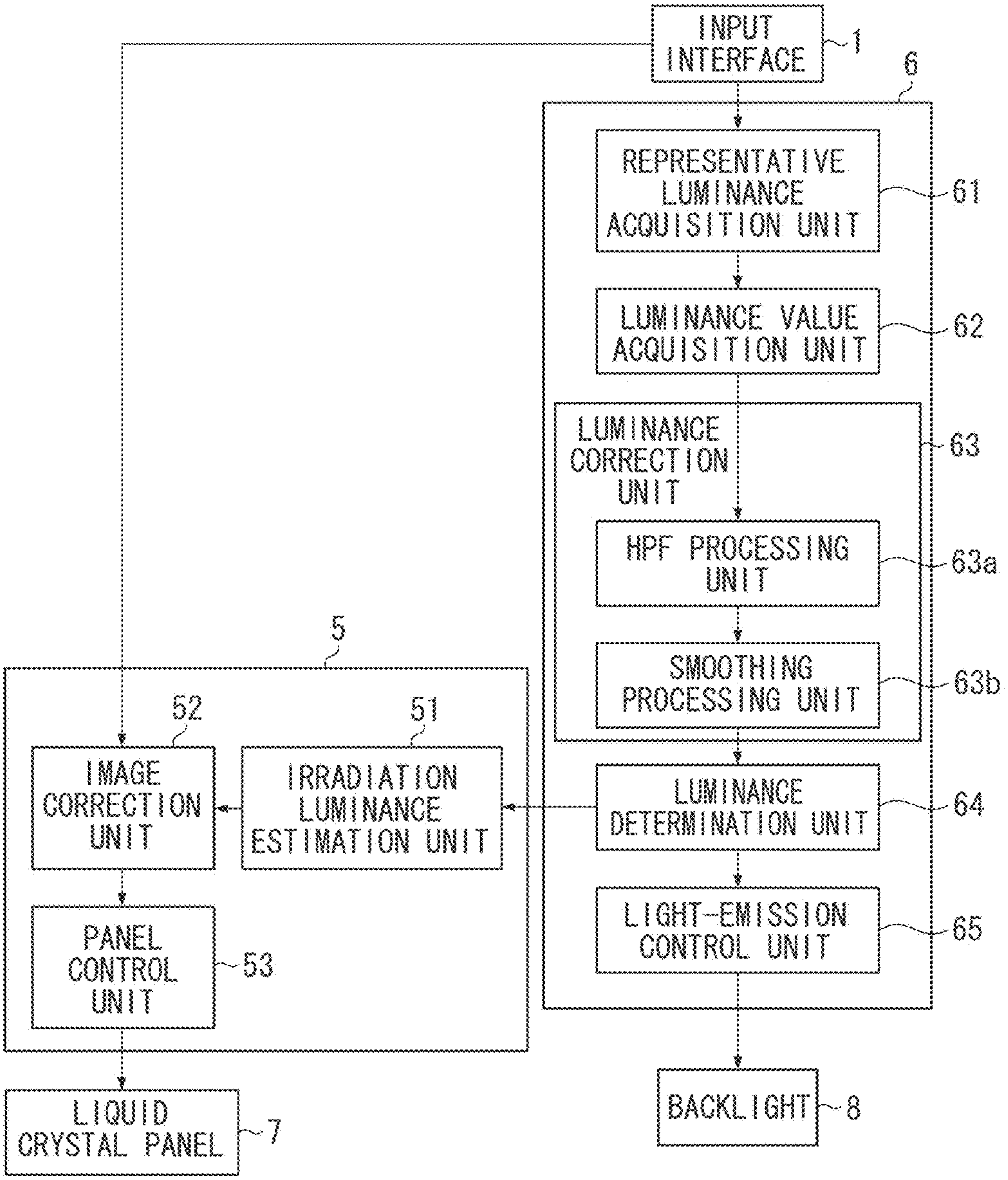
FIG. 3 is a first block diagram illustrating functional blocks of the display apparatus according to the first exemplary embodiment.

FIG. 3 is a block diagram illustrating the input interface 1, the display control unit 5, the backlight control unit 6, the liquid crystal panel 7, and the backlight 8 in an enlarged manner to illustrate circuit modules in the display control unit 5 and the backlight control unit 6, according to the first exemplary embodiment.

The display control unit 5 includes an irradiation luminance estimation unit 51 and an image correction unit 52. The backlight control unit 6 includes a representative luminance acquisition unit 61, a luminance value acquisition unit 62, a luminance correction unit 63, a luminance determination unit 64, and a light-emission control unit 65. The luminance correction unit 63 includes a high pass filter (HPF) processing unit 63*a* and a smoothing processing unit 63*b*.

Each circuit module includes at least one of an electronic circuit and an arithmetic processing circuit. Each circuit module can transmit and receive information to and from the processor 2 and the memory 3 via the bus line 9. The processor 2 may be configured to execute programs read from the memory 3 and control operations to be performed by respective circuit modules. Further, the processor 2 can be configured to realize the functions of respective circuit modules of the display control unit 5 or the backlight control unit 6 by executing the programs read from the memory 3.

The input interface 1 outputs an input image to the representative luminance acquisition unit 61 and the image correction unit 52. The input image is data designating gradation values for respective pixels disposed in a matrix pattern. In the first exemplary embodiment, the gradation value of each pixel of the input image is described as an 8-bit data of 0 to 255. The input image encoding method and the display bit number are not limited to the above-mentioned examples.

Further, the input interface 1 may be configured to output an image obtained by applying predetermined (e.g., gradation conversion) processing on the input image to the representative luminance acquisition unit 61 and the image correction unit 52. Hereinbelow, the image input via the input interface 1 and the image obtainable by applying the predetermined (e.g., gradation conversion) processing on the image input via the input interface 1 are collectively referred to as "input image". Further, the input image can be input from the internal storage 4.

The representative luminance acquisition unit 61 acquires a representative luminance value used to determine the emission luminance value of each light-emitting unit for each input image region corresponding to the light-emitting unit. The representative luminance acquisition unit 61 acquires the representative luminance value for each input image region corresponding to each light-emitting unit of the backlight 8 and outputs the position of each region and the acquired representative luminance value to an emission luminance value acquisition unit 103. In the first exemplary embodiment, the representative luminance value is a maximum gradation value of the image. The representative luminance value is a characteristic value (parameter) representing the brightness (luminance) of the image. As another example, the representative luminance value may be an average gradation value of the image. Further, in a case where the image includes a designation of display luminance for each pixel, the representative luminance value can be a maximum luminance or an average luminance.

The luminance value acquisition unit 62 can acquire an emission luminance value of each light-emitting unit according to the representative luminance value of a partial input image region corresponding to the light-emitting unit. Further, the luminance value acquisition unit 62 can output the acquired emission luminance value to the luminance correction unit 63. The luminance value acquisition unit 62 acquires the emission luminance value from the representative luminance value based on luminance reference information that associates the representative luminance value with the emission luminance value. In the first exemplary embodiment, the luminance reference information is a lookup table (LUT) that associates the luminance characteristic with the emission luminance value.

Figure 4:
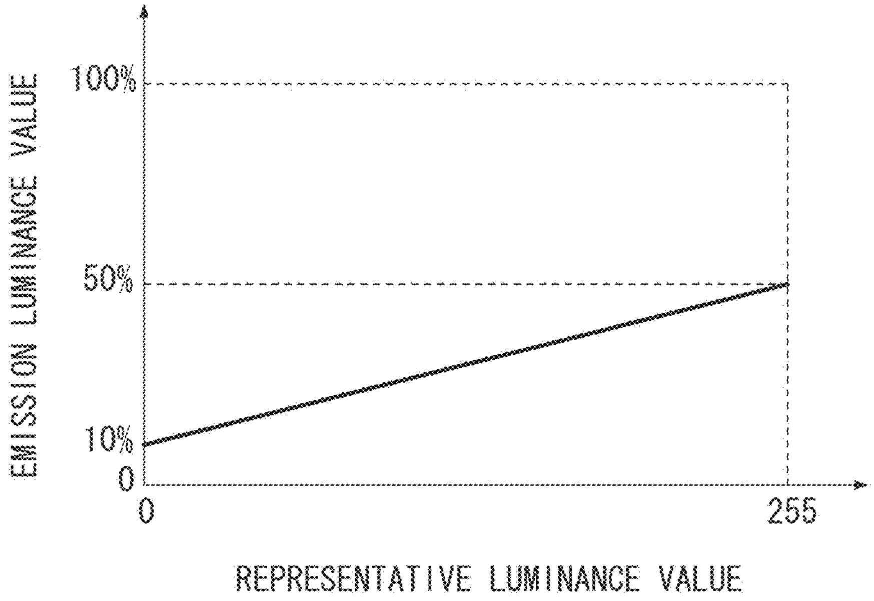
FIG. 4 is a graph illustrating luminance reference information that associates representative luminance value with emission luminance value.

FIG. 4 is a graph illustrating the luminance reference information that associates the representative luminance value with the emission luminance value according to the first exemplary embodiment. In FIG. 4, the horizontal axis indicates the representative luminance value in a range from 0 to 255. The vertical axis indicates the emission luminance value, which is expressed as a ratio of each emission luminance to the maximum emission luminance in each light-emitting unit of the backlight 8. In the first exemplary embodiment, if all light-emitting units of the backlight 8 are turned on at the maximum emission luminance, the luminance of light with which the liquid crystal panel 7 can be irradiated is equal to 2000 cd/m2.

According to the luminance reference information illustrated in FIG. 4, the emission luminance value corresponding to the minimum value (0) of the representative luminance value is 10%. The emission luminance value corresponding to the maximum value (255) of the representative luminance value is 50%. Further, according to the luminance reference information, the emission luminance value linearly increases with a monotonous increase of the representative luminance value.

In this case, if the input image is an entirely black image, the emission luminance value of each light-emitting unit is 10% when the backlight 8 turns on. The luminance of light emitted to the liquid crystal panel 7, i.e., the irradiation luminance of the liquid crystal panel 7, is 200 cd/m2. Further, if the input image is an entirely white image, the emission luminance value of each light-emitting unit is 50% when the backlight 8 turns on. The irradiation luminance of the liquid crystal panel 7 is 1000 cd/m2.

The emission luminance value corresponding to the maximum value of the representative luminance value can be obtained based on the irradiation luminance to attain the maximum display luminance of the display apparatus 100. If the light transmittance of a liquid crystal element at the maximum gradation value is 10% and a setting value of the maximum display luminance of the display apparatus 100 is 100 cd/m2, the emission luminance value corresponding to the maximum value of the representative luminance value is 1000 cd/m2. A user or a designer can arbitrarily set the maximum display luminance of the display apparatus 100.

Further, the luminance reference information is not limited to the above-mentioned example. As another example, a calculation formula capable of converting the representative luminance value into the emission luminance value is usable. The luminance value acquisition unit 62 acquires the emission luminance value of a corresponding light-emitting unit with reference to the representative luminance value and the luminance reference information of a region corresponding to each light-emitting unit.

The luminance correction unit 63 can correct the emission luminance values of respective light-emitting units and output the correction emission luminance values to the luminance determination unit 64. More specifically, the luminance correction unit 63 corrects the emission luminance value of a target light-emitting unit (i.e., one of the plurality of light-emitting units) based on the difference between the emission luminance value of the target light-emitting unit and the emission luminance value of a peripheral light-emitting unit disposed near the target light-emitting unit, to obtain the correction emission luminance value of the target light-emitting unit. If the emission luminance value of the target light-emitting unit is greater than the emission luminance value of at least one peripheral light-emitting unit and if the difference between the emission luminance value of the target light-emitting unit and the emission luminance value of the peripheral light-emitting unit is equal to or greater than a predetermined value, the luminance correction unit 63 increases the correction emission luminance value of the target light-emitting unit compared to the opposite case. The luminance correction unit 63 acquires the correction emission luminance value for each light-emitting unit of the backlight 8.

Causing each light-emitting unit of the backlight 8 to emit light toward the liquid crystal panel 7 by using the correction emission luminance value having been acquired as mentioned above is useful to eliminate the deficiency in the luminance of light emitted to a partial region of the liquid crystal panel 7 that corresponds to the target light-emitting unit. Further, the emission luminance of the peripheral light-emitting unit can be prevented from increasing excessively. Therefore, it is feasible to suppress a misadjusted black level from occurring when a dark image is displayed in a region corresponding to the peripheral light-emitting unit.

The HPF processing unit 63*a* can perform processing for relatively increasing the emission luminance value of a target light-emitting unit (i.e., one of the plurality of light-emitting units) based on the difference between the emission luminance value of the target light-emitting unit and the emission luminance value of a peripheral light-emitting unit. More specifically, the HPF processing unit 63*a* acquires HPT emission luminance values by performing HPF processing on a distribution of acquired emission luminance values, of respective light-emitting units, in such a way as to spatially emphasize high-frequency components. If the difference between the emission luminance value of the target light-emitting unit and the emission luminance value of the peripheral light-emitting unit is large, it means that the emission luminance value of the target light-emitting unit includes spatially high-frequency components.

The HPF processing unit 63*a* outputs the HPF emission luminance values to the smoothing processing unit 63*b*. The HPF processing is characterized by emphasizing high-frequency components through an a×b filter calculation applied to emission luminance values of a plurality of light-emitting units disposed in an a×b (a and b are integers) matrix pattern, including one target light-emitting unit positioned at the center thereof.

The HPF processing in not limited to the above-mentioned example and may include applying differential detection processing on emission luminance values and emphasizing the emission luminance values by using detected edge components. The HPF processing can include high-frequency component emphasizing processing, which is generally used in the image processing related field. Further, any other processing method may be employed for the HPF processing if the processing can emphasize spatially high-frequency components.

Further, the HPF processing can be replaced by processing for relatively increasing the emission luminance value of a target light-emitting unit (i.e., one of the plurality of light-emitting units) if the difference between the emission luminance value of the target light-emitting unit and the emission luminance value of a peripheral light-emitting unit is equal to or greater than a predetermined level. The HPF processing unit 63*a* outputs the HPF emission luminance values obtained by performing the HPF processing on respective light-emitting units to the smoothing processing unit 63*b*.

The smoothing processing unit 63*b* can perform processing for increasing the HPF emission luminance value of a light-emitting unit obtained by the HPF processing unit 63*a*, if the HPF emission luminance value thereof is smaller than a corresponding emission luminance value. The smoothing processing unit 63*b* acquires a correction emission luminance value by performing smoothing processing on the acquired HPF emission luminance value. The smoothing processing unit 63*b* compares the HPF emission luminance value of a target light-emitting unit (i.e., one of the plurality of light-emitting units) with the HPF emission luminance value of a neighboring light-emitting unit that neighbors the target light-emitting unit. In the present exemplary embodiment, the terminology "neighbor" or "neighboring" is a concept expressing a direct or indirect contact of two substances on condition that the distance between them is sufficiently short. If there is a neighboring light-emitting unit having an HPF emission luminance value higher than the HPF emission luminance value of the target light-emitting unit, the smoothing processing unit 63*b* increases the HPF emission luminance value of the target light-emitting unit.

The smoothing processing is not limited to the above-mentioned method and can be any other processing capable of compensating the deficiency of the HPF emission luminance value. For example, the smoothing processing includes low pass filter (LPF) processing that emphasizes spatially low-frequency components by using the filter calculation. The smoothing processing unit 63*b* performs smoothing processing on the HPF emission luminance value of each light-emitting unit and outputs an acquired correction emission luminance value to the luminance determination unit 64.

The method for enabling the luminance correction unit 63 to correct the emission luminance value of each light-emitting unit to obtain the correction emission luminance value is not limited to the above-mentioned example. For example, the luminance correction unit 63 can obtain the correction emission luminance value of the target light-emitting unit by correcting the emission luminance value of the target light-emitting unit based on the difference between the emission luminance value of the target light-emitting unit and the emission luminance value of the peripheral light-emitting unit. More specifically, the luminance correction unit 63 obtains the correction emission luminance value of the target light-emitting unit by increasing the emission luminance value of the target light-emitting unit based on the difference between the emission luminance value of the target light-emitting unit and the emission luminance value of the peripheral light-emitting unit.

The luminance correction unit 63 can be configured to designate each light-emitting unit as the target light-emitting unit and, if the difference between the emission luminance value of the target light-emitting unit and the emission luminance value of the peripheral light-emitting unit is equal to or greater than a predetermined value, can perform processing for increasing the emission luminance value of the target light-emitting unit compared to the opposite case. A user or a designer can arbitrarily set the predetermined value.

The luminance correction unit 63 can be configured to perform correction processing that includes calculating a mean square of emission luminance differences between the target light-emitting unit and eight neighboring peripheral light-emitting units positioned in the up-and-down direction, in the right-and-left direction, and in two diagonal directions and adding the obtained mean square to the emission luminance value of the target light-emitting unit. Thus, the luminance correction unit 63 can obtain the correction emission luminance value by increasing the emission luminance value of the target light-emitting unit if the emission luminance value of the peripheral light-emitting unit is smaller than the emission luminance value of the target light-emitting unit. The peripheral light-emitting units used in the above-mentioned mean square calculation may be light-emitting units disposed in a 5×5 matrix pattern around the target light-emitting unit, except the center (i.e., target) light-emitting unit. In this case, the luminance correction unit 63 may be configured to calculate the correction emission luminance value by weighting the emission luminance value according to the distance between the target light-emitting unit and each peripheral light-emitting unit.

More specifically, according to the correction processing performed by the luminance correction unit 63, if the emission luminance value of the peripheral light-emitting unit is greater than the emission luminance value of the target light-emitting unit, the correction emission luminance value of the target light-emitting unit becomes a higher value which is increased compared to the emission luminance value of the target light-emitting unit according to the emission luminance difference between the target light-emitting unit and the peripheral light-emitting unit. Further, according to the correction processing performed by the luminance correction unit 63, if the emission luminance value of the peripheral light-emitting unit is smaller than the emission luminance value of the target light-emitting unit, the correction emission luminance value of the target light-emitting unit becomes a value which is increased compared to the emission luminance value of the target light-emitting unit according to the emission luminance difference between the target light-emitting unit and the peripheral light-emitting unit.

Further, the luminance value correction unit 63 may be configured to compare the emission luminance value of the target light-emitting unit with the emission luminance value of the peripheral light-emitting unit and, if the difference is equal to or greater than a predetermined level, perform correction processing in such a way as to increase the emission luminance value of the target light-emitting unit and calculate the correction emission luminance value.

The luminance determination unit 64 can determine the luminance setting value of each light-emitting unit of the backlight 8 based on the acquired correction emission luminance value. The luminance setting value is expressed as a ratio of each emission luminance to the maximum emission luminance in each light-emitting unit of the backlight 8, similar to each emission luminance value. The luminance determination unit 64 determines the correction emission luminance value as the luminance setting value. Alternatively, the luminance determination unit 64 can be configured to correct the correction emission luminance value to reduce the influence of natural light before determining the luminance setting value. The luminance determination unit 64 outputs the determined luminance setting value to the irradiation luminance estimation unit 51 and the light-emission control unit 65.

The light-emission control unit 65 can control the emission luminance of each light-emitting unit of the backlight 8 based on the luminance setting value. In a case where the pulse width modulation (PWM) is employed to control the light-emission amount of the light-emitting unit, the light-emission control unit 65 designates a duty ratio of the pulse width modulation (i.e., a ratio of light-on period to light-off period), as control information, based on the luminance setting value. Further, the light-emission control unit 65 may be configured to control the light emission amount of each light-emitting unit by setting a drive voltage (or drive current) value of each light-emitting unit. In this case, the light-emission control unit 65 designates the drive voltage (or drive current) value, as control information, based on the luminance setting value.

Further, the light-emission control unit 65 may be configured to control the emission luminance of each light-emitting unit by performing the pulse width modulation and the control of the drive voltage (or drive current) value of the light-emitting unit. In this case, the duty ratio of the pulse width modulation (i.e., the ratio of light-on period to light-off period) and the drive voltage (or drive current) value are determined based on the luminance setting value. The light-emission control unit 65 outputs the determined control information to the backlight 8 and controls the emission luminance of each light-emitting unit of the backlight 8.

The irradiation luminance estimation unit 51 can acquire an irradiation luminance to be used by the image correction unit 52 to correct the input image, using the luminance setting value acquired from the luminance determination unit 64. The irradiation luminance is the luminance of light emitted toward the liquid crystal panel 7 in a case where each light-emitting unit of the backlight 8 turns on based on the luminance setting value.

The irradiation luminance estimation unit 51 estimates the irradiation luminance at the center of a display region of the liquid crystal panel 7 that corresponds to each light-emitting unit. The irradiation luminance estimation unit 51 acquires diffusion information from the memory 3. The diffusion information indicates a ratio of light that diffuses into a display region corresponding to a neighboring light-emitting unit in a case where the light is emitted from one light-emitting unit.

The irradiation luminance estimation unit 51 estimates the irradiation luminance at the center of each display region of the liquid crystal panel 7 acquired based on the luminance setting value of each light-emitting unit and the diffusion information. Further, the irradiation luminance estimation unit 51 can interpolate an irradiation luminance at the center of each display region and estimate an irradiation luminance distribution. The irradiation luminance estimation unit 51 outputs the acquired irradiation luminance to the image correction unit 52.

The image correction unit 52 can correct an input image and generate a display image using the acquired irradiation luminance and output the generated display image to a panel control unit 53. If the irradiation luminance of a display region corresponding to a concerned light-emitting unit is Lpn, the image correction unit 52 determines a correction coefficient Gpn using a reference luminance Lt of the concerned light-emitting unit. The reference luminance Lt is an emission luminance value associated with the gradation value "255" and indicates irradiation luminance obtained when all light-emitting units are controlled. More specifically, the reference luminance Lt according to the first exemplary embodiment is 1000 cd/m2. The correction coefficient Gpn can be determined according to the following formula 1.

$$Gpn=Lt/Lpn \qquad \text{Formula 1}$$

The image correction unit 52 can acquire the gradation value of the display image by correcting the gradation value of an input image to be displayed in a corresponding display region using the correction coefficient Gpn determined for each display region. The image correction unit 52 multiplies the correction coefficient Gpn of a corresponding display region with respect to the gradation value of an input image displayed in the same display region. Alternatively, the image correction unit 52 can acquire an interpolated correction value using the correction coefficients Gpn of neighboring display regions and can multiply the acquired correction value with the gradation value of an input image.

The panel control unit 53 can control the transmittance of each liquid crystal element of the liquid crystal panel 7 based on the display image acquired from the image correction unit 52. More specifically, the panel control unit 53 controls the voltage to be applied to each liquid crystal element according to the gradation value of the display image. An image can be displayed on the liquid crystal panel 7 when the light emitted from the backlight 8 penetrates each liquid crystal element.

Figure 5:
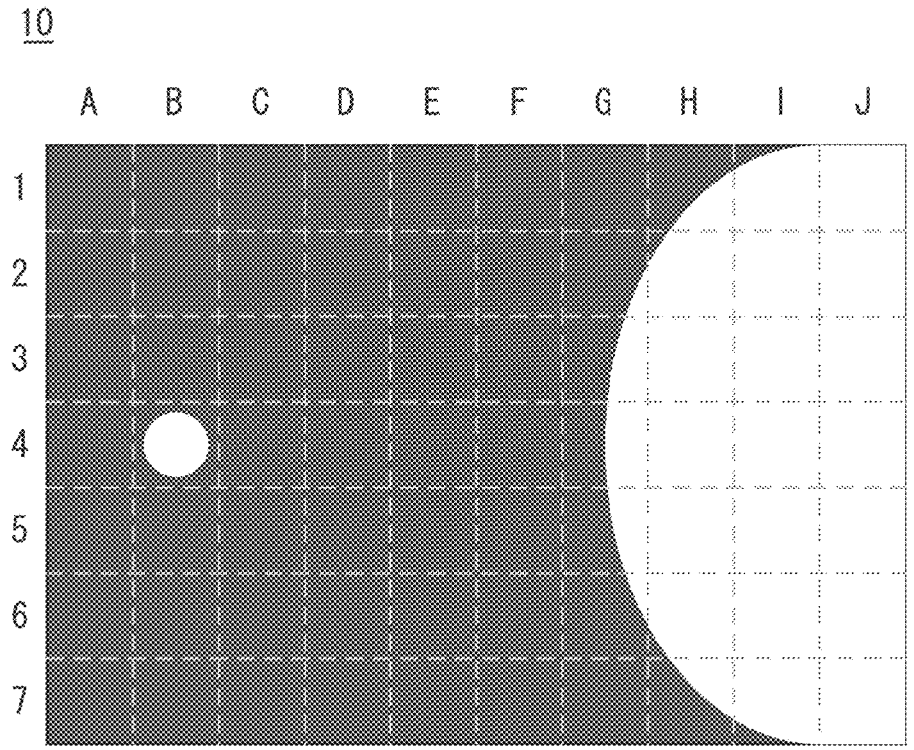
FIG. 5 schematically illustrates an input image.

The display apparatus 100 performs backlight control processing as described in detail below. FIG. 5 schematically illustrates an input image 10, which has been output from the input interface 1 to the image correction unit 52 and the representative luminance acquisition unit 61. In FIG. 5, rectangular regions indicated by dotted lines are partial regions of the input image respectively corresponding to the light-emitting units of the backlight 8 illustrated in FIG. 2. Hereinbelow, the partial regions of the input image are expressed as regions A1 to J7, similar to the light-emitting units.

In the first exemplary embodiment, the input image 10 includes a bright image portion in the region B4. Further, the input image 10 includes bright image portions in the regions G2 to G6, H1 to H7, I1 to I7, and J1 to J7. The gradation value of each bright image portion is "255". The input image 10 includes a dark image displayed in the other region. The gradation value of the dark image is "16". The regions A3, A4, A5, B3, B5, C3, C4, and C5, respectively neighboring the region B4 (i.e., the region including the bright image portion), are completely dark image regions. Hereinbelow, a region including an image portion locally brighter compared to neighboring regions is hereinbelow referred to as "partial high-luminance region".

The partial high-luminance region is not limited to the above-mentioned region (e.g., the region B4) in which an image portion brighter compared to the images displayed in neighboring regions is displayed. If the luminance of an image portion displayed in a concerned region is higher than the luminance of an image displayed in at least one of peripheral regions, the concerned region can be regarded as a partial high-luminance region. For example, the input image 10 also includes partial high-luminance regions G2 to G6, H1, and H7.

The representative luminance acquisition unit 61 acquires the representative luminance value for the partial input image region corresponding to each light-emitting unit. In the first exemplary embodiment, the representative luminance value is the maximum gradation value of a pixel in each region of the input image.

FIG. 6 schematically illustrates representative luminance values of corresponding input image regions acquired by the representative luminance acquisition unit 61, in relation to respective light-emitting units of the backlight 8, in the first exemplary embodiment. In the first exemplary embodiment, the luminance characteristic is the maximum gradation value included in each region. Therefore, the luminance characteristic of each region including a bright image portion (e.g., the regions B4, G2 to G6, H1 to H7, I1 to I7, and J1 to J7) is 255. Similarly, the luminance characteristic of each region occupied by the dark image (e.g., the regions A1 to A7, B1 to B3, B5 to B7, C1 to F7, G1, and G7) is 16. The representative luminance acquisition unit 61 outputs the acquired representative luminance values of the input image regions corresponding to respective light-emitting units to the luminance value acquisition unit 62.

The luminance value acquisition unit 62 acquires the emission luminance value of each light-emitting unit using the representative luminance value of an input image region corresponding to the corresponding light-emitting unit. The luminance value acquisition unit 62 acquires the luminance reference information, which associates the representative luminance value with the light-emitting unit, from the memory 3. The luminance reference information is the graph illustrated in FIG. 4. The luminance value acquisition unit 62 acquires the emission luminance value of each light-emitting unit with reference to the representative luminance value of an input image region corresponding to the corresponding light-emitting unit, as well as and the luminance reference information.

FIG. 7 schematically illustrates emission luminance values corresponding to respective light-emitting units of the backlight 8, which have been acquired by the luminance value acquisition unit 62, in the first exemplary embodiment. The emission luminance values of the light-emitting units B4, G2 to G6, H1 to H7, I1 to I7, and J1 to J7, in which the representative luminance value of the corresponding input image region is "255", are 50%. Further, the emission luminance values of the light-emitting units A1 to A7, B1 to B3, B5 to B7, C1 to F7, G1, and G7, in which the representative luminance value of the corresponding input image region is "16", are 13%. The luminance value acquisition unit 62 outputs the acquired emission luminance values corresponding to respective light-emitting units to the HPF processing unit 63*a*.

The HPF processing unit 63*a* performs HPF processing on the emission luminance values in such a way as to emphasize high-frequency components and outputs the HPF emission luminance values to the smoothing processing unit 63*b*. In the first exemplary embodiment, the HPF processing unit 63*a* acquires the HPF emission luminance value of a target light-emitting unit by performing filter calculation on the emission luminance values of the light-emitting units disposed in a 5×5 matrix pattern, which includes the target light-emitting unit positioned at the center thereof. The following formula 2 indicates the filter calculation that obtains the HPF emission luminance value of the light-emitting unit C3.

Formula 2

$$\begin{pmatrix} Fv2 & Fv1 & Fv0 & Fv1 & Fv2 \end{pmatrix} \begin{pmatrix} BL\_A1 & BL\_B1 & BL\_C1 & BL\_D1 & BL\_E1 \\ BL\_A2 & BL\_B2 & BL\_C2 & BL\_D2 & BL\_E2 \\ BL\_A3 & BL\_B3 & BL\_C3 & BL\_D3 & BL\_E3 \\ BL\_A4 & BL\_B4 & BL\_C4 & BL\_D4 & BL\_E4 \\ BL\_A5 & BL\_B5 & BL\_C5 & BL\_D5 & BL\_E5 \end{pmatrix} \begin{pmatrix} Fh2 \\ Fh1 \\ Fh0 \\ Fh1 \\ Fh2 \end{pmatrix} = HPF\_BL\_C3$$

The formula 2 includes emission luminance values BL_A1 to BL_E5 of the light-emitting units A1 to E5 disposed in the 5×5 matrix pattern including the center light-emitting unit C3. Further, the formula 2 includes filter coefficients Fh0 to Fh2 in the horizontal direction and filter coefficients Fv0 to Fv2 in the vertical direction. In the first exemplary embodiment, it is assumed that relations Fh0=Fv0=1.2, Fh1=Fv1=−0.06, and Fh2=Fv2=−0.04 are satisfied. Regarding the filter calculation result, it is also feasible to adjust the number of digits by performing round-off or round-down processing considering the processing capability of each circuit module described below.

The total number and the range of respective light-emitting units neighboring the target light-emitting unit and related coefficients can be arbitrarily set by a user or a designer in the filter calculation. In a case where the filter calculation result becomes a negative value, the HPF emission luminance value is regarded as 0.

FIG. 8 schematically illustrates HPF emission luminance values corresponding to respective light-emitting units of the backlight 8, which have been acquired by the HPF processing unit 63*a*, in the first exemplary embodiment. The HPF processing unit 63*a* increases the emission luminance value of the light-emitting unit (included in the distribution illustrated in FIG. 7), if the emission luminance value has rapidly changed. When the light-emitting unit B4 is concerned, the emission luminance value of the light-emitting unit B4 is 50, which is greatly different from the emission luminance value (=13) of each neighboring light-emitting unit. In other words, the rapid increase in emission luminance value can be confirmed. Accordingly, the HPF emission luminance value of the light-emitting unit B4 increases to 66 through the filter calculation. The HPF processing unit 63*a* outputs the HPF emission luminance values corresponding to respective light-emitting units to the smoothing processing unit 63*b*.

The smoothing processing unit 63*b* increases the HPF emission luminance value of a target light-emitting unit (one of the plurality of light-emitting units) if the HPF emission luminance value of the target light-emitting unit is less than the HPF emission luminance value of a neighboring light-emitting unit neighboring the target light-emitting unit. The smoothing processing unit 63*b* multiplies a smoothing coefficient and a largest difference between the HPF emission luminance value of the target light-emitting unit and the HPF emission luminance value of the neighboring light-emitting unit and adds the obtained value to the HPF emission luminance value of the target light-emitting unit. In the first exemplary embodiment, the smoothing coefficient is 0.3. The smoothing processing unit 63*b* performs the above-mentioned processing for each of the plurality of light-emitting units and acquires the correction emission luminance value of each light-emitting unit.

Further, the smoothing processing unit 63*b* performs the above-mentioned smoothing processing a plurality of times. In the first exemplary embodiment, the smoothing processing unit 63*b* performs the smoothing processing three times for each light-emitting unit. Performing the smoothing processing a plurality of times is effective to smoothen a level difference between the light-emitting units with respect to of the HPF emission luminance value. Smoothening the level difference between the light-emitting units with respect to the HPF emission luminance value brings an effect of reducing the level difference with respect to the luminance of an image displayed by the display apparatus 100.

FIG. 9 schematically illustrates correction emission luminance values corresponding to respective light-emitting units of the backlight 8, in the first exemplary embodiment, which have been acquired through the smoothing processing performed three times on the HPF emission luminance values by the smoothing processing unit 63*b*. As a result of the smoothing processing, the change of the correction emission luminance value becomes smoother in the column of the light-emitting units B1 to B7, compared to the change of the HPF emission luminance value in the corresponding column illustrated in FIG. 8. Further, the HPF emission luminance value having become equal to or less than the emission luminance value through the HPF processing becomes a value comparable to or greater than the emission luminance value.

The smoothing processing does not greatly reduce the HPF emission luminance value of the light-emitting unit B4, which corresponds to the partial high-luminance region B4. Therefore, the effect of increasing the emission luminance value of the light-emitting unit B4 corresponding to the region B4 can be maintained appropriately. The smoothing processing unit 63*b* outputs the correction emission luminance values of respective light-emitting units to the luminance determination unit 64.

The luminance determination unit 64 determines the correction emission luminance values of respective light-emitting units as luminance setting values and outputs the determined luminance setting values to the irradiation luminance estimation unit 51 and the light-emission control unit 65. The light-emission control unit 65 controls lighting of respective light-emitting units of the backlight 8 based on the acquired luminance setting values.

The above is the details of the backlight control processing that can be performed by the display apparatus 100. To realize a part or the whole of the above-mentioned processing to be performed by each circuit module, the processor 2 can execute the programs read from the memory 3. In this case, the processor 2 executes the programs in such a way as to realize respective processing steps in the above-mentioned order.

Figure 10:
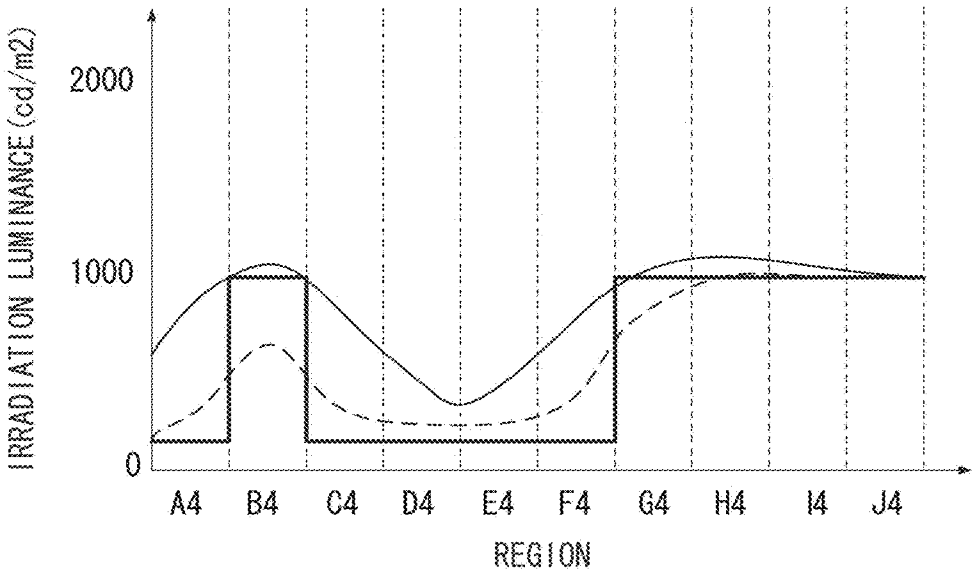
FIG. 10 schematically illustrates the luminance of light emitted to display regions of a liquid crystal panel corresponding to light-emitting units A4 to J4.

The first exemplary embodiment brings the following effects. FIG. 10 schematically illustrates luminance distributions of light emitted to the display regions of the liquid crystal panel 7 corresponding to the light-emitting units A4, B4, C4, D4, E4, F4, G4, H4, I4, and J4 (Hereinbelow, referred to as light-emitting units A4 to J4), in the first exemplary embodiment. In FIG. 10, a black solid line indicates an irradiation luminance distribution in the display regions corresponding to respective light-emitting units obtainable when each light-emitting unit turns on based on the luminance setting value determined by the luminance determination unit 64, in the first exemplary embodiment.

In FIG. 10, a black broken line indicates a comparative irradiation luminance distribution in the display regions corresponding to respective light-emitting units obtainable when the light-emitting units turn on based on the emission luminance values determined with reference to the representative luminance values illustrated in FIG. 7. In FIG. 10, a bold line indicates the irradiation luminance to display the input image appropriately in respective display regions. An assumption in the first exemplary embodiment is that the irradiation luminance to display an image including gradation value "255" is 1000 cd/m2. Accordingly, the display regions B4, G4, H4, I4, and J4 have the irradiation luminance of 1000 cd/m2 to display the input image including the bright image portion having the gradation value "255".

On the other hand, the dark image of gradation value "16" is displayed in the display regions A4, C4, D4, E4, and F4. In this case, the gradation value of the image displayed in the display regions A4, C4, D4, E4, and F4 can be expanded by approximately 16 (=255/16) times. Accordingly, the irradiation luminance is 62.5 cd/m2, which is 1/16 of 1000 cd/m2.

First, the comparative example indicated by the black dotted line in FIG. 10 will be described in detail below. The light-emitting units G4, H4, I4, and J4 turn on at the luminance setting values corresponding to the emission luminance value "50%". The light diffusing from neighboring light-emitting units enters respective light-emitting units H4, I4, and J4. Therefore, the reduction in irradiation luminance that may occur due to the diffusion from the display region can be suppressed appropriately. The irradiation luminance of respective display regions H4, I4, and J4 becomes 1000 cd/m2. Further, due to the influence of light diffusing into the neighboring display region F4, the irradiation luminance of the display region G4 becomes equal to or less than 1000 cd/m2.

On the other hand, the light-emitting unit B4 turns on at the luminance setting value corresponding to the emission luminance value "50%", similar to the light-emitting units G4, H4, I4, and J4. However, the emission luminance value of each light-emitting unit neighboring the light-emitting unit B4 is lower. In other words, the light-emitting unit B4 cannot receive sufficient diffusion light from the neighboring light-emitting units. Accordingly, the irradiation luminance of the display region B4 becomes a greatly smaller value, compared to the value (=1000 cd/m2).

According to the first exemplary embodiment indicated by the black solid line in FIG. 10, the light-emitting units G4, H4, I4, and J4 turn on at the luminance setting values corresponding to the correction emission luminance value "50%" to "54%". The light diffusing from neighboring light-emitting units enters respective light-emitting units H4, I4, and J4. The irradiation luminance of corresponding display regions becomes equal to or greater than 1000 cd/m2. Further, the irradiation luminance of the display region G4 becomes equal to or greater than 1000 cd/m2, because the luminance correction unit 63 performs the HPF processing and the smoothing processing in such a way as to increase the luminance setting values of the light-emitting unit G4 and the neighboring light-emitting unit F4. Accordingly, the display regions G4, H4, I4, and J4 can be irradiated with light at the irradiation luminance to display a bright image.

Further, the light-emitting unit B2 corresponding to the display region B2 turns on at a luminance setting value corresponding to the correction emission luminance value "66%". Further, the correction emission luminance value of the light-emitting unit neighboring the light-emitting unit B2 is greater than the emission luminance value acquired from the representative luminance value. Accordingly, even when the light diffusing from the light-emitting unit B2 is taken into consideration, the irradiation luminance of the display region B2 becomes equal to or greater than 1000 cd/m2. Further, the smoothing processing causes the correction emission luminance value of the light-emitting unit neighboring the light-emitting unit B2 to decrease gradually. Therefore, the luminance level difference at the display region that displays the dark image can be prevented from being visually recognized as display unevenness.

As mentioned above, the display apparatus according to the first exemplary embodiment is configured to display an image by independently controlling the emission luminance for each of a plurality of light-emitting units. The display apparatus according to the first exemplary embodiment performs processing for increasing the emission luminance of a target light-emitting unit based on the difference between the emission luminance value of the target light-emitting unit and the emission luminance value of a peripheral light-emitting unit. The emission luminance value corresponds to the brightness of an image displayed in the display region corresponding to the light-emitting unit. In other words, it can also be said that the display apparatus according to the first exemplary embodiment performs processing for increasing the emission luminance of a light-emitting unit corresponding to the region where a partial high-luminance region is displayed based on the difference between the luminance of an input image displayed in the partial high-luminance region and the luminance of an image displayed in a peripheral region neighboring the partial high-luminance region.

Further, the display apparatus according to the first exemplary embodiment may be configured to control the emission luminance of a target light-emitting unit in such a manner that the emission luminance of the target light-emitting unit becomes higher, compared to the opposite case, if the emission luminance value of the target light-emitting unit is higher than the emission luminance value of a peripheral light-emitting unit by a predetermined value. In other words, it can also be said that the emission luminance of a light-emitting unit that corresponds to the region where the partial high-luminance region is displayed becomes higher, compared to the opposite case, if the luminance of an input image displayed in the partial high-luminance region is higher than the luminance of an image displayed in a peripheral region neighboring the partial high-luminance region by a predetermined value. In this case, a user or a designer can arbitrarily designate the predetermined value.

More specifically, the display apparatus according to the first exemplary embodiment obtains the correction emission luminance value of each light-emitting unit by increasing the emission luminance value of a target light-emitting unit based on the difference between the emission luminance value of the target light-emitting unit and the emission luminance value of a light-emitting unit neighboring the target light-emitting unit, and performing processing for acquiring the correction emission luminance value of the target light-emitting unit.

More specifically, the display apparatus according to the first exemplary embodiment acquires the correction emission luminance of the target light-emitting unit by increasing the emission luminance value of the target light-emitting unit according to the difference in emission luminance value between the target light-emitting unit and a light-emitting unit neighboring the target light-emitting unit if the emission luminance value of the target light-emitting unit is greater than the emission luminance value of the neighboring light-emitting unit. Further, the display apparatus according to the first exemplary embodiment acquires the correction emission luminance of the target light-emitting unit by increasing the emission luminance value of the target light-emitting unit according to the difference in emission luminance value between the target light-emitting unit and a light-emitting unit neighboring the target light-emitting unit if the emission luminance value of the target light-emitting unit is smaller than the emission luminance value of the neighboring light-emitting unit.

Accordingly, the display apparatus according to the first exemplary embodiment can provide irradiation luminance to realize an appropriate display even when an image including a locally bright image is displayed.

It becomes feasible to suppress the display unevenness in a dark image region neighboring a locally bright image region by smoothening the change in emission luminance through the smoothing processing for reducing the luminance level difference at the light-emitting unit.

In the above-mentioned first exemplary embodiment, the display apparatus controls the emission luminance of each light-emitting unit by performing the correction processing on the emission luminance value of each light-emitting unit determined according to the representative luminance value of an input image region corresponding to each light-emitting unit. However, the method for controlling the emission luminance of each light-emitting unit is not limited to the above-mentioned example. For example, it is feasible to determine the emission luminance value of each light-emitting unit based on the corrected representative luminance value obtainable by performing the above-mentioned correction processing on the representative luminance value of an input image region corresponding to each light-emitting unit. In this case, the block diagram illustrated in FIG. 3 is modified in such a way as to locate the luminance correction unit 63 between the representative luminance acquisition unit 61 and the luminance value acquisition unit 62. Further, it is desirable to use reference luminance information, which associates the corrected representative luminance value and the emission luminance value and different from that described above, determined in such a manner that the emission luminance value matches the range of the corrected the representative luminance value.

If the peripheral luminance of a partial high-luminance region included in an image is lower than the luminance of the partial high-luminance region by a predetermined level, the emission luminance of a light-emitting unit corresponding to the region where the partial high-luminance region is displayed can be increased through the above-mentioned processing, compared to the opposite case. Accordingly, the display apparatus according to the first exemplary embodiment can provide irradiation luminance to realize an appropriate image display even when an image including a locally bright image (i.e., a partial high-luminance region) is displayed.

Figure 11:
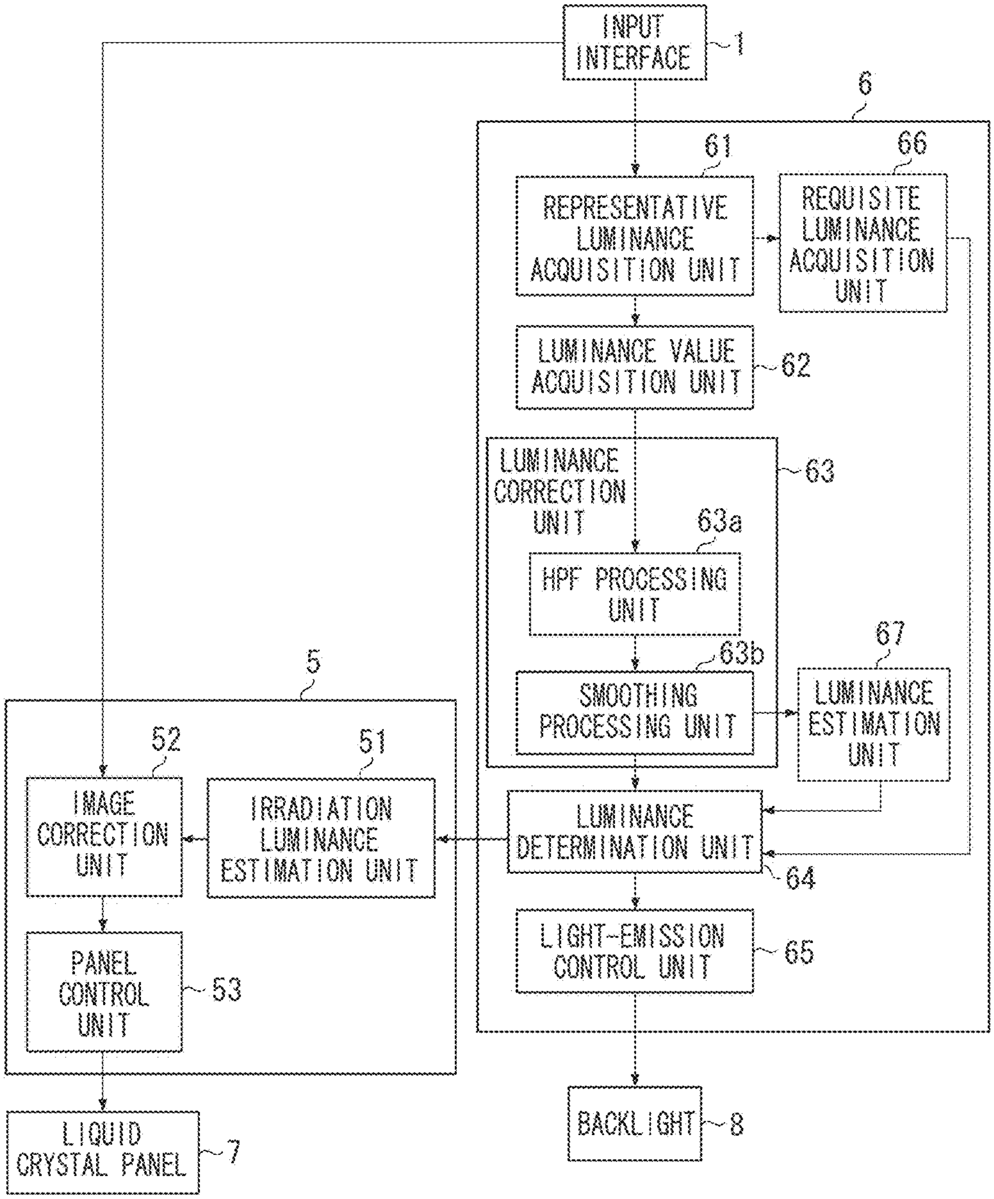
FIG. 11 is a second block diagram illustrating functional blocks of a display apparatus according to a second exemplary embodiment.

A display apparatus 200 according to a second exemplary embodiment will be described in detail below. An apparatus configuration of the display apparatus 200 is similar to that of the display apparatus 100 and therefore redundant description thereof will be avoided. FIG. 11 is a block diagram illustrating an input interface 1, a display control unit 5, a backlight control unit 6, a liquid crystal panel 7, and a backlight 8 according to the second exemplary embodiment, in which the backlight control unit 6 illustrated in FIG. 3 is enlarged to illustrate circuit modules included therein. The display apparatus 200 according to the second exemplary embodiment is different from the display apparatus 100 described in the first exemplary embodiment in that the backlight control unit 6 additionally includes a requisite luminance acquisition unit 66 and a luminance estimation unit 67.

Redundant description of a circuit module that can realize a function similar to that described in the first exemplary embodiment (i.e., a functional block whose name is similar to that described in the first exemplary embodiment) will be avoided.

The requisite luminance acquisition unit 66 can acquire requisite luminance, which is irradiation luminance to display an image in each region, based on the representative luminance value of each region of an input image. The requisite luminance acquisition unit 66 acquires requisite luminance information that associates the representative luminance value with the requisite luminance from the memory 3. The requisite luminance acquisition unit 66 acquires the requisite luminance of a corresponding display region with reference to the representative luminance value of each region and the requisite luminance information. The requisite luminance acquisition unit 66 outputs the requisite luminance of each display region to the luminance determination unit 64.

The luminance estimation unit 67 can acquire estimation luminance, which is estimated luminance of light emitted to each display region when the emission luminance of each light-emitting unit is controlled based on the correction emission luminance value acquired from the luminance correction unit 63. The luminance estimation unit 67 acquires diffusion information from the memory 3. The luminance estimation unit 67 acquires the estimation luminance with reference to the diffusion information and the correction emission luminance value. The luminance estimation unit 67 outputs the estimation luminance to the luminance determination unit 64.

The luminance determination unit 64 compares the requisite luminance of each display region with the estimation luminance, corrects the correction emission luminance value, and determines the luminance setting value of each light-emitting unit. The luminance determination unit 64 determines a correction coefficient using the estimation luminance and the requisite luminance. The correction coefficient is a ratio of the requisite luminance to the estimation luminance in a display region where the requisite luminance is smaller than the estimation luminance and the difference between the requisite luminance and the estimation luminance is largest. The luminance determination unit 64 determines the luminance setting value by multiplying the correction coefficient with the correction emission luminance value of each light-emitting unit. The luminance determination unit outputs the determined luminance setting value to the light-emission control unit 65.

Hereinbelow, backlight control processing that can be performed by the display apparatus 200 according to the second exemplary embodiment will be described in detail below. The representative luminance acquisition unit 61 acquires the representative luminance value of an input image region corresponding to each light-emitting unit based on an input image input from the input interface 1. The method for acquiring the representative luminance value is similar to that described in the first exemplary embodiment, and therefore redundant description thereof will be avoided. The representative luminance acquisition unit 61 outputs the representative luminance value of each light-emitting unit to the luminance value acquisition unit 62 and the requisite luminance acquisition unit 66.

The requisite luminance acquisition unit 66 acquires the requisite luminance information from the memory 3. The requisite luminance information includes requisite luminance “1000 cd/m2” associated with the maximum value (255) of the representative luminance value. Further, the requisite luminance information includes requisite luminance “X/255×1000 cd/m2” associated with the representative luminance value X (0≤X<255). The requisite luminance acquisition unit 66 acquires the requisite luminance of a corresponding display region from the requisite luminance information, using the representative luminance value of each input image region. The requisite luminance acquisition unit 66 outputs the requisite luminance to the luminance determination unit 64.

Emission luminance value acquiring processing to be performed based on the representative luminance value acquired by the luminance value acquisition unit 62 and HPF emission luminance value acquiring processing to be performed by the HPF processing unit 63*a* are similar to those described in the first exemplary embodiment, and therefore redundant description thereof will be avoided.

The smoothing processing unit 63*b* performs smoothing processing on the HPF emission luminance value. In the second exemplary embodiment, the smoothing processing unit 63*b* performs the smoothing processing with the smoothing coefficient being set to 0.1. The smoothing processing, which smoothens the emission luminance between two light-emitting units, brings an effect of preventing the display unevenness from being visually confirmed. On the other hand, the smoothing processing may unnecessarily increase the emission luminance of a light-emitting unit corresponding to a dark image region, which is positioned far from a region including a bright image portion. Setting a smaller smoothing coefficient brings an effect of appropriately suppressing the increase in emission luminance of a light-emitting unit corresponding to the dark image positioned far from the region including the bright image portion. The smoothing processing unit 63*b* outputs the correction emission luminance value to the luminance determination unit 64 and the luminance estimation unit 67.

The luminance estimation unit 67 acquires the diffusion information from the memory 3 and acquires the estimation luminance of each display region obtainable when each light-emitting unit emits light based on the correction emission luminance value. The luminance estimation unit 67 outputs the estimation luminance to the luminance determination unit 64.

The luminance determination unit 64 acquires the luminance value setting value by further correcting the correction emission luminance value of the corresponding light-emitting unit using the estimation luminance and the requisite luminance in each display region. The luminance determination unit 64 acquires the luminance value setting value by uniformly correcting the correction emission luminance value of each light-emitting unit with u the ratio of the requisite luminance to the estimation luminance in a display region where the difference between the requisite luminance and the estimation luminance is largest.

Figure 12:
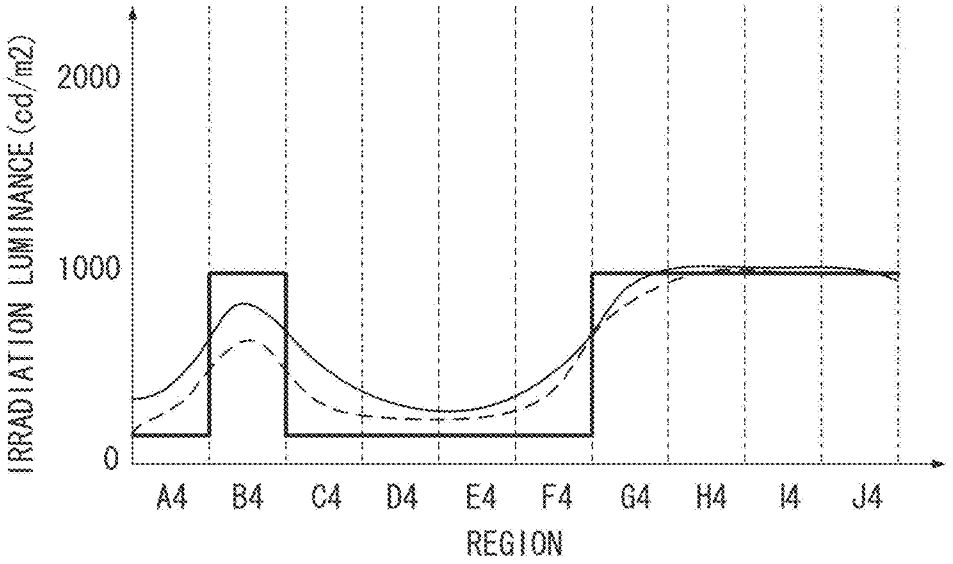
FIG. 12 schematically illustrates estimation luminance and requisite luminance in the display regions A4 to J4.

FIG. 12 schematically illustrates the estimation luminance acquired by the luminance estimation unit 67 and the requisite luminance acquired by the requisite luminance acquisition unit 66, corresponding to the display regions A4 to J4, in the second exemplary embodiment. In FIG. 12, a black solid line indicates a distribution of estimation luminance in respective display regions, acquired by the luminance estimation unit 67, in the second exemplary embodiment. In FIG. 12, a bold line indicates the requisite luminance in each display region.

In FIG. 12, the estimation luminance values of the display regions B4 and G4 are smaller than the corresponding requisite luminance values. The requisite luminance values of the display regions B4 and G4 are 1000 cd/m2. The estimation luminance of the display region B4 is 872 cd/m2. The estimation luminance of the display region G4 is 961 cd/m2. Accordingly, the display region in which the difference between the estimation luminance and the requisite luminance is largest is the display region B4. The ratio of the requisite luminance the estimation luminance in the display region B4 is 1.15 (=1000/872). Accordingly, the luminance determination unit 64 determines that the correction coefficient is equal to 1.15. The luminance determination unit 64 acquires the luminance setting values by uniformly multiplying the correction coefficient with the correction emission luminance value of each light-emitting unit. The luminance determination unit outputs the luminance setting values of respective light-emitting units to the light-emission control unit 65.

The light-emission control unit 65 controls the emission luminance of the backlight 8, based on the luminance setting value, similar to the first exemplary embodiment.

Figure 13:
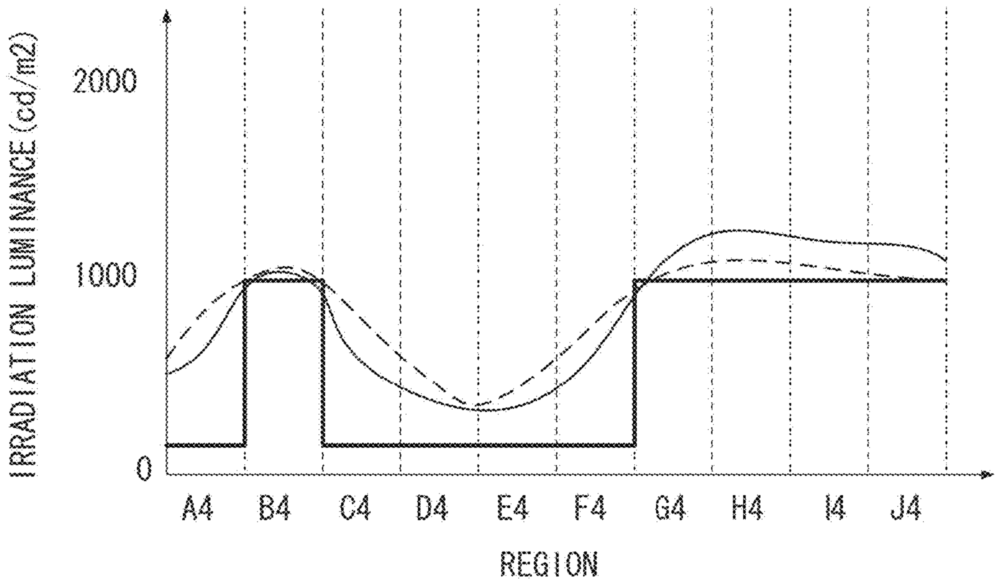
FIG. 13 schematically illustrates the luminance of light emitted to the display regions of the liquid crystal panel corresponding to the light-emitting units A4 to J4.

The second exemplary embodiment brings the following effects. FIG. 13 schematically illustrates the luminance of light emitted to the display regions of the liquid crystal panel 7 corresponding to the light-emitting units A4 to J4, in the second exemplary embodiment. In FIG. 13, a black solid line indicates an irradiation luminance distribution in the display regions corresponding to respective light-emitting units obtainable when each light-emitting unit turns on based on the luminance setting value determined by the luminance determination unit 64, in the second exemplary embodiment.

In FIG. 13, a black dotted line indicates a comparative irradiation luminance distribution in the display regions corresponding to respective light-emitting units obtainable when each light-emitting unit turns on based on the luminance setting value determined by the luminance determination unit 64, in the first exemplary embodiment.

The display apparatus according to the second exemplary embodiment can emit light to the display region B4, in which a locally bright image is displayed, with the irradiation luminance satisfying the requisite luminance, similar to the first exemplary embodiment. Further, the display apparatus according to the second exemplary embodiment can prevent the irradiation luminance from increasing relative to the requisite luminance in the display regions A4, C4, and D4 (respectively neighboring the display region B4) in which the dark image is displayed.

The display regions A4, C4, and D4 are dark image regions. In a case where the liquid crystal panel 7 uses liquid crystal elements whose transmittance increases in accordance with increase of the voltage applied thereon, it is usual to apply a lower voltage to display a dark image in such a way as to lower the transmittance of the liquid crystal element. In a case where the liquid crystal element is driven at a lower voltage, the transmittance of the liquid crystal element may not be sufficiently reduced due to the characteristics of the liquid crystal element. If the luminance of light emitted from the backlight is high, an unintentional amount of light may penetrate the liquid crystal panel 7 and reach the front side thereof. In this case, the display apparatus will suffer the display unevenness or the misadjusted black level that is visually confirmed. Such a phenomenon is conspicuous in a region where a dark image is displayed.

The display apparatus according to the second exemplary embodiment can suppress the increase of the irradiation luminance relative to the requisite luminance in the display regions A4, C4, and D4 (neighboring the display region B4) in which the dark image is displayed. Accordingly, the display apparatus according to the second exemplary embodiment can control the irradiation luminance of a light-emitting unit corresponding to a locally bright image in such a way as to satisfy the requisite luminance and can suppress the irradiation luminance of a light-emitting unit corresponded to a dark image neighboring the bright image from becoming excessively greater compared to the requisite luminance.

According to the second exemplary embodiment, the display apparatus displays an image by independently controlling the emission luminance of a plurality of light-emitting units and can perform processing for increasing the emission luminance of a light-emitting unit in which the emission luminance value is larger compared to that of a neighboring light-emitting unit. Accordingly, the display apparatus can provide irradiation luminance in such a way as to realize an appropriate display in a case where an image to be displayed include a partial high-luminance region (i.e., a locally bright portion).

Further, the display apparatus according to the second exemplary embodiment can suppress the display unevenness from occurring in a dark image region neighboring the partial high-luminance region through the smoothing processing for smoothening the level difference between light-emitting units in such a way as to reduce the change in emission luminance.

Further, in a case where the image including a partial high-luminance region is displayed, the display apparatus according to the second exemplary embodiment can suppress the occurrence of misadjusted black level by suppressing the irradiation luminance of a display region corresponding to a dark region other than the bright region.

Figure 14:
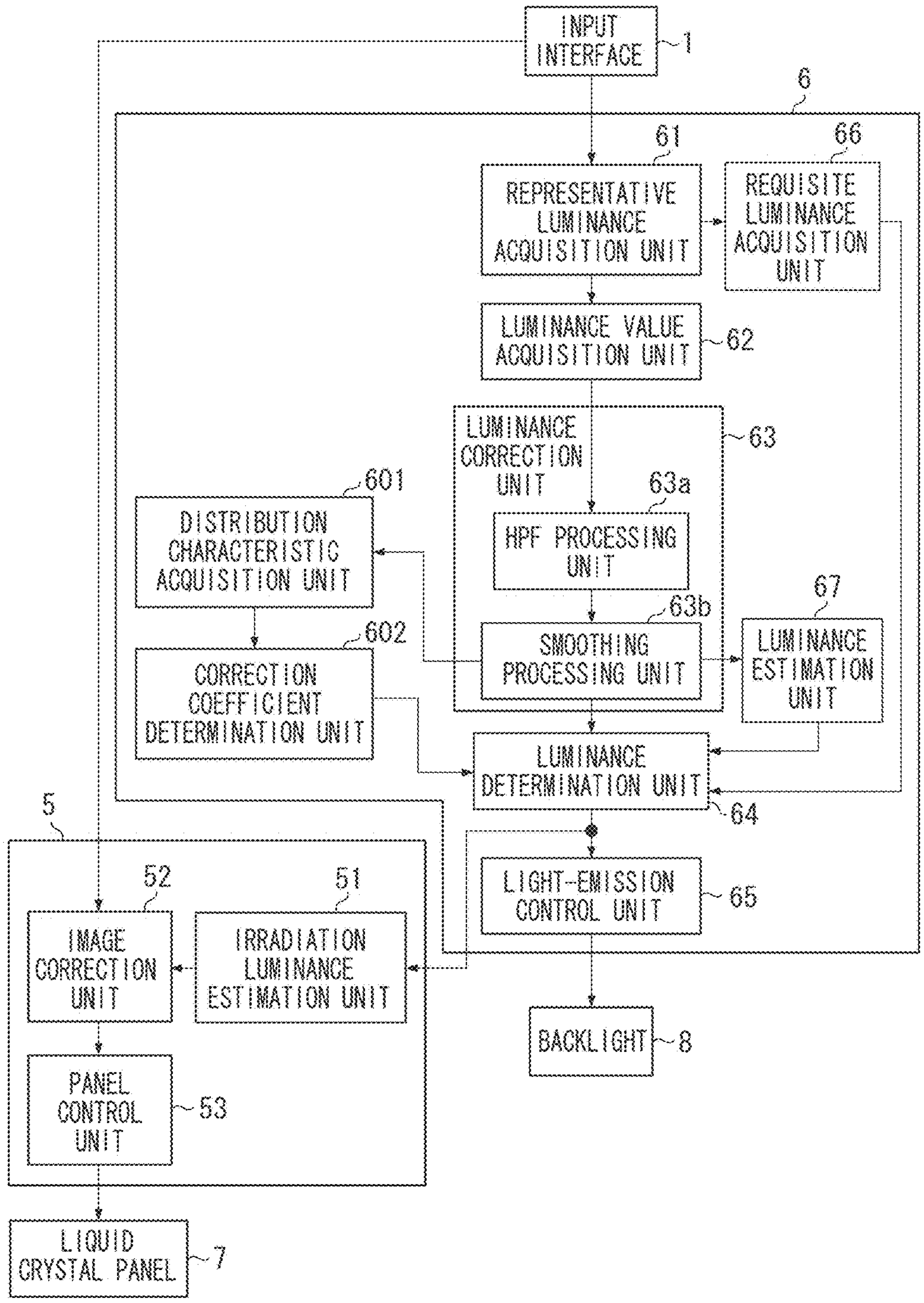
FIG. 14 is a third block diagram illustrating functional blocks of a display apparatus according to a third exemplary embodiment.

A display apparatus 300 according to a third exemplary embodiment will be described in detail below. An apparatus configuration of the display apparatus 300 is similar to that of the display apparatus 100 illustrated in FIG. 1, and therefore redundant description thereof will be avoided. FIG. 14 is a block diagram illustrating functional blocks of the display apparatus 300 according to the third exemplary embodiment. FIG. 14 illustrates a plurality of circuit modules that are provided in the display control unit 5 and the backlight control unit 6 of the display apparatus 300. Compared to the display apparatus 200 described in the second exemplary embodiment with reference to FIG. 11, the display apparatus 300 is different in that the backlight control unit 6 additionally includes a distribution characteristic acquisition unit 601 and a correction coefficient determination unit 602.

Redundant description of a circuit module that can realize a function similar to that described in the second exemplary embodiment (i.e., a functional block whose name is similar to that described in the second exemplary embodiment) will be avoided.

The distribution characteristic acquisition unit 601 can acquire luminance distribution characteristic based on the correction emission luminance values acquired from the luminance correction unit 63. The luminance distribution characteristic according to the present exemplary embodiment is an average value, maximum value, or minimum value of the correction emission luminance value. The distribution characteristic acquisition unit 601 outputs the luminance distribution characteristic to the correction coefficient determination unit 602.

The correction coefficient determination unit 602 can determine a luminance correction coefficient, which is usable to correct the size of the luminance setting value, based on the luminance distribution characteristic acquired from the distribution characteristic acquisition unit 601. The correction coefficient determination unit 602 determines the degree of the unevenness by checking whether the correction emission luminance unevenness of each light-emitting unit is equal to or greater than a threshold value (th1) based on the luminance distribution characteristic. More specifically, if the difference between the maximum value (or the minimum value) and the average value of the correction emission luminance value is greater than the threshold value th1, the correction coefficient determination unit 602 determines that the correction emission luminance unevenness of the light-emitting unit is large. In other words, the correction coefficient determination unit 602 determines that the correction emission luminance unevenness of the light-emitting unit is small if the difference is equal to or less than the threshold value th1 in both the difference between the maximum value and the average value and the difference between the minimum value and the average value. For example, a practical value of the threshold value th1 is 5.

If it is determined that the correction emission luminance unevenness is large, the correction coefficient determination unit 602 sets the value of the luminance correction coefficient to md1. If it is determined that the correction emission luminance unevenness is small, the correction coefficient determination unit 602 sets the value of the luminance correction coefficient to md2, which is smaller than md1 (i.e., md1>md2). For example, a practical value of md1 is 1.2 and a practical value of md2 is 1.0.

The luminance determination unit 64 determines the luminance setting value of each light-emitting unit based on the requisite luminance, the estimation luminance, and the luminance correction coefficient. Similar to the second exemplary embodiment, the luminance determination unit 64 determines the correction coefficient based on a comparison between the requisite luminance and the estimation luminance. The luminance determination unit 64 determines the luminance setting value by multiplying the correction coefficient and the luminance correction coefficient with the correction emission luminance value of each light-emitting unit. The luminance determination unit 64 outputs the luminance setting value to the irradiation luminance estimation unit 51 and the light-emission control unit 65.

Hereinbelow, backlight control processing that can be performed by the display apparatus 300 according to the third exemplary embodiment will be described in detail below. The display apparatus 300 includes functional blocks that perform operations similar to those described in the second exemplary embodiment. Therefore, redundant description thereof will be avoided.

The distribution characteristic acquisition unit 601 acquires the luminance distribution characteristic based on the correction emission luminance value. Similar to the second exemplary embodiment, when the correction emission luminance value is acquired based on the input image illustrated in FIG. 5, the luminance distribution characteristic has an average value 36, a maximum value 66, and a minimum value 12. If the input image is the completely white image (i.e., when each pixel value of the input image is 255), the luminance distribution characteristic according to the present exemplary embodiment has an average value 50, a maximum value 50, and a minimum value 50.

The correction coefficient determination unit 602 checks the presence of unevenness based on the luminance distribution characteristic and determines the luminance correction coefficient value. If the threshold value th1 is 5, the difference between the maximum value and the average value of the correction emission luminance value is equal to or greater than threshold value th1 and the difference between the minimum value and the average value of the correction emission luminance value is equal to or greater than threshold value th1, in the luminance distribution characteristic of the correction emission luminance value determined based on the input image illustrated in FIG. 5. Accordingly, the correction coefficient determination unit 602 determines that the unevenness is large with respect to the correction emission luminance value determined based on the input image illustrated in FIG. 5. In this case, the correction coefficient determination unit 602 sets the luminance correction coefficient value to md1 (=1.2).

If the input image is a completely white image, the difference between the maximum value and the average value of the correction emission luminance value is less than the threshold value th1 and the difference between the minimum value and the average value of the correction emission luminance value is less than the threshold value th1. Therefore, the correction coefficient determination unit 602 determines that the unevenness is small with respect to the correction emission luminance value determined based on the input image. In this case, the correction coefficient determination unit 602 sets the luminance correction coefficient value to md2 (=1.0).

The luminance determination unit 64 acquires the luminance setting value of each light-emitting unit by multiplying the correction coefficient, obtained from the requisite luminance and the estimation luminance of each light-emitting unit, with the correction emission luminance value of each light-emitting unit and further uniformly multiplying the luminance correction coefficient value with the correction emission luminance value of each light-emitting unit.

Figure 15:
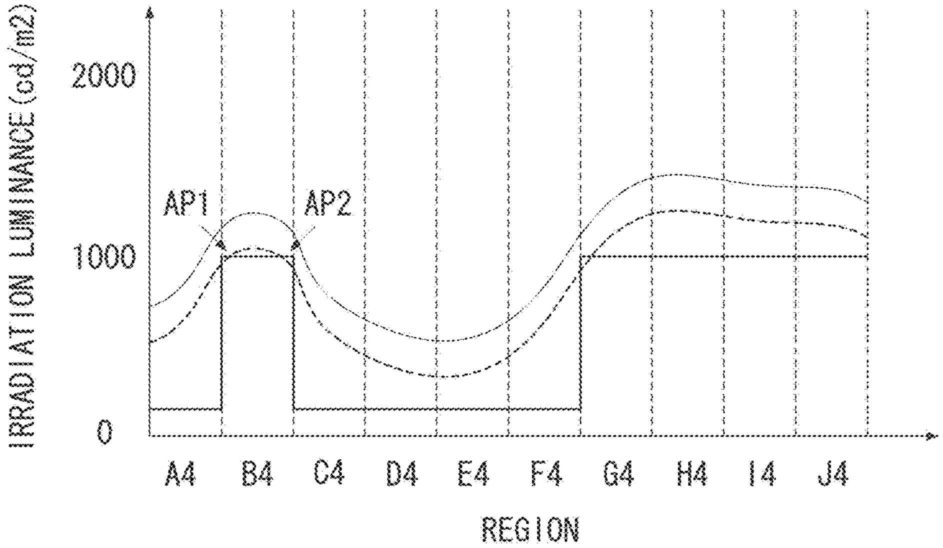
FIG. 15 schematically illustrates the luminance of light emitted to the display regions of the liquid crystal panel corresponding to the light-emitting units A4 to J4, in a case where the input image is as illustrated in FIG. 5.
Figure 16:
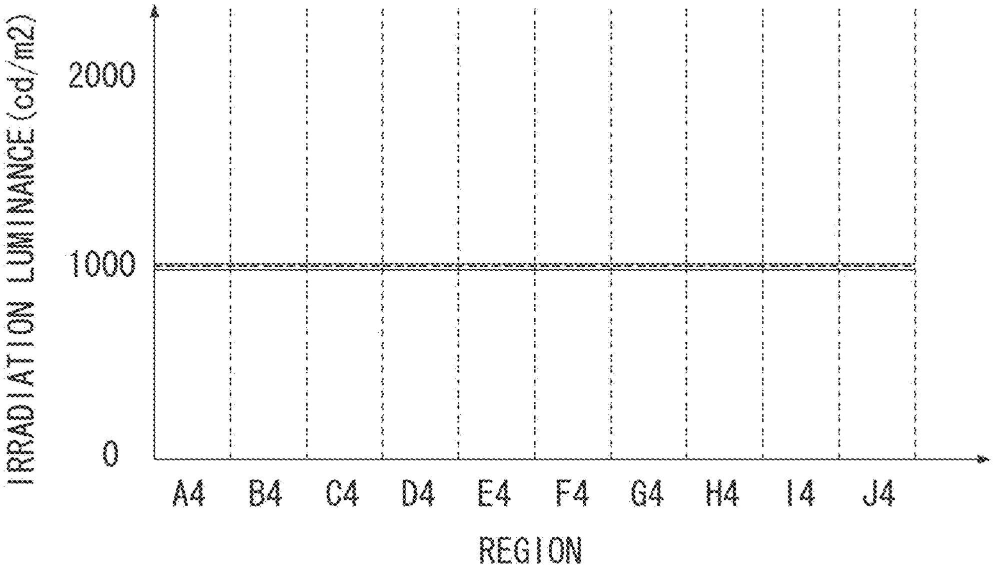
FIG. 16 schematically illustrates the luminance of light emitted to the display regions of the liquid crystal panel corresponding to the light-emitting units A4 to J4, in a case where the input image is a completely white image.

The third exemplary embodiment bring the following effects. FIGS. 15 and 16 schematically illustrate the luminance of light emitted to the display regions of the liquid crystal panel 7 corresponding to the light-emitting units A4 to J4 in the third exemplary embodiment. FIG. 15 schematically illustrates the luminance of light emitted to the display regions of the liquid crystal panel 7 when the input image is the image illustrated in FIG. 5 that includes the partial high-luminance region. In FIG. 15, a solid line indicates an irradiation luminance distribution in the display regions corresponding to respective light-emitting units obtainable when each light-emitting unit turns on based on the luminance setting value determined by the luminance determination unit 64, in the third exemplary embodiment. In FIG. 15, a dotted line indicates an irradiation luminance distribution in the display regions corresponding to respective light-emitting units obtainable when each light-emitting unit turns on based on the luminance setting value determined by the luminance determination unit 64, in the second exemplary embodiment.

As illustrated in FIG. 15, the display apparatus according to the third exemplary embodiment can emit light to the display region B4, in which the locally bright image is displayed, at the irradiation luminance satisfying the requisite luminance, similar to the first and second exemplary embodiments. The display apparatus according to the third exemplary embodiment can further increase the irradiation luminance by using the luminance correction coefficient so that edge regions AP1 and AP2, positioned at both edges of the display region B4, can be irradiated with the light at the irradiation luminance satisfy the requisite luminance. Accordingly, the display apparatus can emit light to the entire partial high-luminance region, including edge regions, at comparatively higher irradiation luminance.

FIG. 16 schematically illustrates the luminance of light emitted to the display regions of the liquid crystal panel 7 in a case where the input image is a completely white image. In FIG. 16, a solid line indicates an irradiation luminance distribution in the display regions corresponding to respective light-emitting units obtainable when each light-emitting unit turns on based on the luminance setting value determined by the luminance determination unit 64, in the third exemplary embodiment. In FIG. 16, a dotted line indicates an irradiation luminance distribution in the display regions corresponding to respective light-emitting units obtainable when each light-emitting unit turns on based on the luminance setting value determined by the luminance determination unit 64, in the second exemplary embodiment. When the image not including any partial high-luminance region is displayed, the unevenness in correction emission luminance becomes smaller.

The display apparatus according to the third exemplary embodiment reduces the luminance correction coefficient if the image to be displayed does not include any partial high-luminance region. Therefore, the light emitted from each light-emitting unit can be prevented from being enhanced unnecessarily.

Further, the display apparatus according to the third exemplary embodiment determines the coefficient for further correcting the corrective luminance value according to the unevenness in corrective luminance value. Therefore, reducing the coefficient is feasible for the corrective luminance value determined based on the input image not including any partial high-luminance region. Accordingly, it becomes feasible to prevent electric power consumption of the light-emitting unit from increasing by the correction.

In the third exemplary embodiment, the same luminance correction coefficient is applied to each light-emitting unit. However, the luminance correction coefficient can be partially changed if desired. For example, it is feasible to set the luminance correction values applied to the light-emitting units corresponding to outer peripheral display regions A1 to J1, J1 to J7, A7 to J7, A1 to A7, each neighboring a smaller number of light-emitting units, to be greater than the luminance correction values applied to the remaining light-emitting units corresponding to inner regions of the liquid crystal panel 7. The light can be emitted at sufficiently higher irradiation luminance when the luminance correction values applied to the outer peripheral light-emitting units each neighboring a smaller number of light-emitting units are set to be higher, compared to those applied to the inner light-emitting units.

Further, in the third exemplary embodiment, the luminance distribution characteristic to be used by the distribution characteristic acquisition unit 601 is not limited to the average value, the maximum value, and the minimum value of the correction emission luminance and can be any other value. For example, the luminance distribution characteristic can be a sum or a dispersion of the correction emission luminance value. For example, if the sum value (designated as the luminance distribution characteristic) is equal to or greater than a predetermined value, the correction coefficient determination unit 602 can determine that the unevenness is small. If the sum value is less than the predetermined value, the correction coefficient determination unit 602 determines that the unevenness is large.

Further, if the dispersion value (designated as the luminance distribution characteristic) is equal to or less than the predetermined value, the correction coefficient determination unit 602 can determine that the unevenness is small. If the dispersion value is greater than the predetermined value, the correction coefficient determination unit 602 can determine that the unevenness is large.

Further, in the third exemplary embodiment, the information to be referred to by the distribution characteristic acquisition unit 601 to acquire the luminance distribution characteristic is not limited to the correction emission luminance value, and may be any other value usable to determine the unevenness with respect to the luminance distribution. For example, the representative luminance value acquired by the representative luminance acquisition unit 61, the requisite luminance acquired by the requisite luminance acquisition unit 66, the estimation luminance acquired by the luminance estimation unit 67, and the luminance setting value acquired by the luminance determination unit 64 are usable.

Further, in a case where the input image is a video signal of 60 Hz or 120 Hz, it is useful to provide a time-direction recursive filter in the correction coefficient determination unit 602 to suppress the variation in luminance correction coefficient. In this case, the variation in irradiation luminance can be suppressed.

Figure 17:
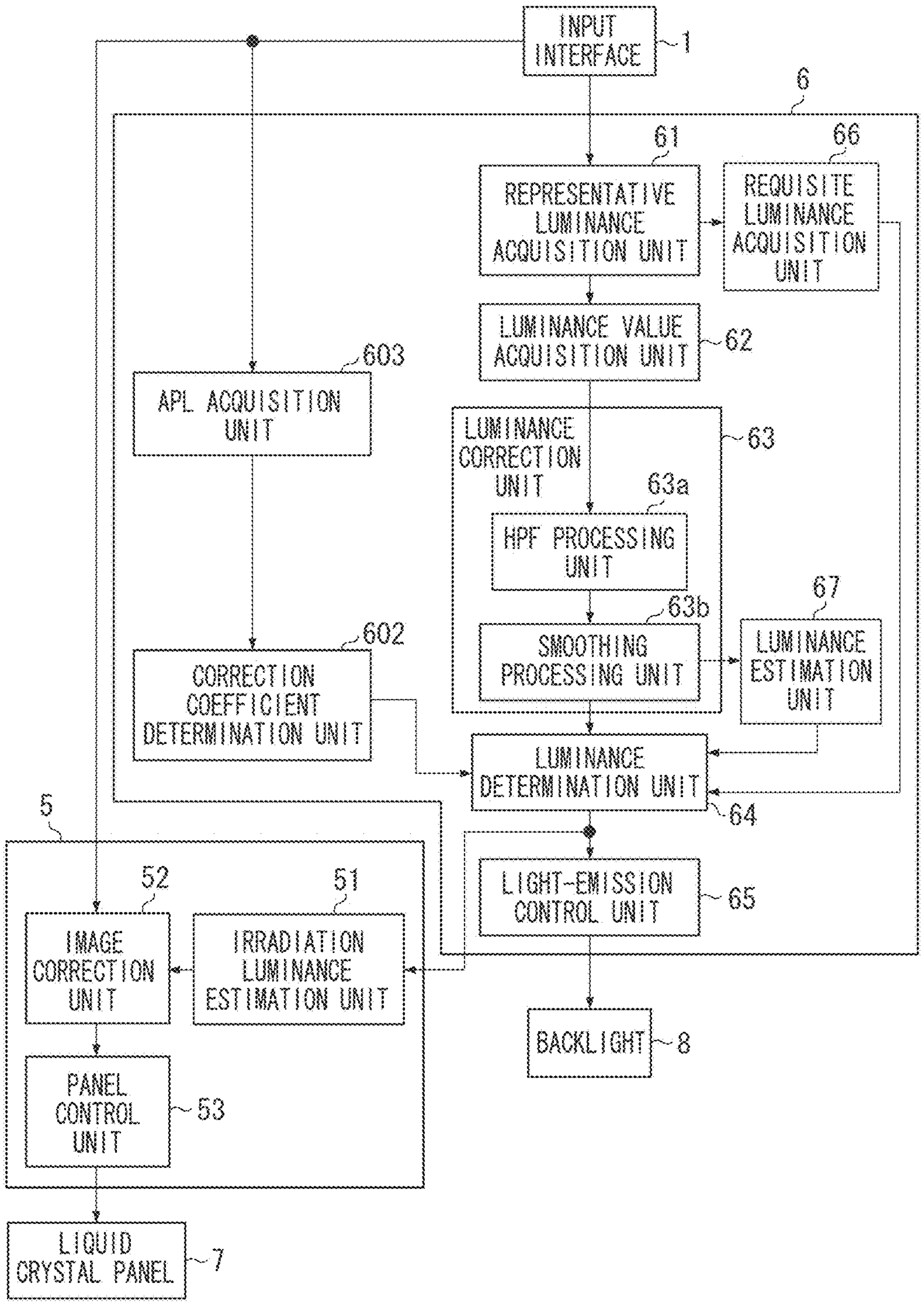
FIG. 17 is a fourth block diagram illustrating functional blocks of a display apparatus according to a fourth exemplary embodiment.

A display apparatus 400 according to a fourth exemplary embodiment will be described in detail below. An apparatus configuration of the display apparatus 400 is similar to that of the display apparatus 100, and therefore redundant description thereof will be avoided. FIG. 17 is a block diagram illustrating functional blocks of the display apparatus 400 according to the fourth exemplary embodiment. FIG. 17 illustrates circuit modules provided in the display control unit 5 and the backlight control unit 6 of the display apparatus 400.

The display apparatus 400 is different from the display apparatus 300 described in the third exemplary embodiment with reference to FIG. 14, in that the backlight control unit 6 includes an APL acquisition unit 603 instead of providing the distribution characteristic acquisition unit 601.

Redundant description of a circuit module that can realize a function similar to that described in the third exemplary embodiment (i.e., a functional block whose name is similar to that described in the third exemplary embodiment) will be avoided.

The APL acquisition unit 603 can acquire Average Picture Level (APL) of an input image and output the acquired APL to the correction coefficient determination unit 602. In the present exemplary embodiment, the APL is an average gradation value of the image. Further, in a case where the display luminance is designated for each pixel of the image, the APL may be an average luminance value.

Figure 18:
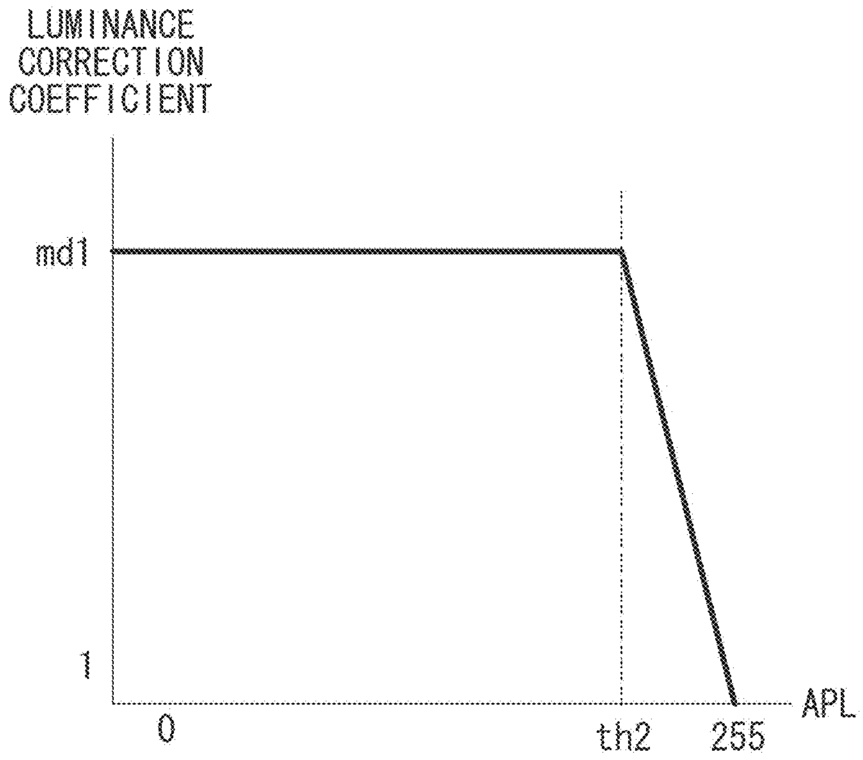
FIG. 18 schematically illustrates a relationship between average picture level (APL) and luminance correction coefficient of a correction coefficient determination unit.

The correction coefficient determination unit 602 determines the luminance correction coefficient, which is usable to correct the luminance setting value, based on the APL acquired from the APL acquisition unit 603. FIG. 18 illustrates a relationship between the APL and the luminance correction coefficient. As illustrated in FIG. 18, the luminance correction coefficient is md1 when the APL is equal to or less than a threshold value th2. The luminance correction coefficient linearly decreases from md1 to 1 when the APL is greater than the threshold value th2. For example, the threshold value th2 is 250.

The display apparatus 400 according to the fourth exemplary embodiment performs the following backlight control processing. The display apparatus 400 includes functional blocks that perform operations similar to those described in the third exemplary embodiment. Therefore, redundant description thereof will be avoided.

The APL acquisition unit 603 operates in the following manner. If the input image is the image illustrated in FIG. 5, the APL acquired by the APL acquisition unit 603 is 108. If the input image is a completely white image, the APL is 255.

The correction coefficient determination unit 602 operates in the following manner. When the input image is the image illustrated in FIG. 5, the APL (=108) is smaller than the threshold th2 (=250). Therefore, the correction coefficient determination unit 602 sets the luminance correction coefficient value to md1. When the input image is a completely white image, the APL (=255) is greater than the threshold value th2 (=250). In this case, as understood from FIG. 18, the luminance correction coefficient value is 1.0.

The luminance determination unit 64 determines the luminance setting value of each light-emitting unit based on the requisite luminance, the estimation luminance, and the luminance correction coefficient, similar to the third exemplary embodiment. The rest of the operation is similar to that described in the third exemplary embodiment, and therefore redundant description thereof will be avoided.

As mentioned above, similar to the first to third exemplary embodiments, the display apparatus according to the fourth exemplary embodiment can emit light at the irradiation luminance that satisfies the requisite luminance in each display region in which a locally bright image is displayed. The display apparatus can further increase the irradiation luminance by using the luminance correction coefficient so that an edge portion of the display region in which the locally bright image is displayed can be irradiated with the light at the irradiation luminance, which is sufficiently higher compared to the requisite luminance.

Further, in a case where an image not including any partial high-luminance region is displayed, the display apparatus according to the fourth exemplary embodiment can prevent the light from being excessively emitted by reducing the luminance correction coefficient.

Similar to the third exemplary embodiment, the display apparatus according to the fourth exemplary embodiment sets an appropriate luminance correction value for an outer peripheral display region neighboring a smaller number of light-emitting units so that the light can be constantly emitted at sufficiently higher irradiation luminance.

Other Embodiments

Embodiment(s) of the aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-204103, filed Oct. 15, 2015, and No. 2016-148941, filed Jul. 28, 2016, which are hereby incorporated by reference herein in their entirety.

What is claimed is:

1. A display apparatus comprising:

a plurality of light-emitting units configured to emit light;

a display unit configured to display an image on a screen with transmitted light emitted based on an input image;

a first acquisition unit configured to acquire initial luminance values of the plurality of light-emitting units based on the luminance of each of a plurality of regions of the input image corresponding to each of the plurality of light-emitting units;

a first processing unit configured to acquire intermediate luminance values of the plurality of light-emitting units by correcting the initial luminance values, wherein the first processing unit increases an initial luminance value of a first target light-emitting unit among the plurality of light-emitting units that is greater than an initial luminance value of a first neighboring light-emitting unit neighboring the first target light-emitting unit, according to a difference of the initial luminance value of the first target light-emitting unit and the initial luminance value of the first neighboring light-emitting unit;

a second processing unit configured to acquire correct luminance values of the plurality of light-emitting units by correcting the intermediate luminance values, wherein the second processing unit increases an intermediate luminance value of a second target light-emitting unit among the plurality of light-emitting units that is smaller than an intermediate luminance value of a second neighboring light-emitting unit neighboring the second target light-emitting unit, according to a difference of the intermediate luminance value of the second target light-emitting unit and the intermediate luminance value of the second neighboring light-emitting unit, the second target light-emitting unit being same or different from the first target light-emitting unit; and a control unit configured to control light emission of each of the plurality of light-emitting units according to the correct luminance value of each of the plurality of light-emitting units.

2. The display apparatus according to claim 1, wherein the first processing unit acquires the intermediate luminance values of the plurality of light-emitting units by performing filter calculation on a distribution of the initial luminance values of the plurality of light-emitting units in such a way as to emphasize high-frequency components of the distribution.

3. The display apparatus according to claim 1, wherein the first processing unit acquires the intermediate luminance value of the first target light-emitting unit by adding a value obtained by multiplying a predetermined coefficient with the initial luminance value of the first neighboring light-emitting unit to the initial luminance value of the first target light-emitting unit.

4. The display apparatus according to claim 1, wherein the second processing unit acquires the correct luminance value of the second target light-emitting unit by increasing the intermediate luminance value of the second target light-emitting unit according to the difference between the intermediate luminance value of the second target light-emitting unit and the highest luminance value among a plurality of the intermediate luminance values of a plurality of the second target light-emitting units.

5. The display apparatus according to claim 1, further comprising:

a second acquisition unit configured to acquire a requisite luminance to display the input image;

an estimation unit configured to acquire an estimation luminance of the display unit in a case where the plurality of light-emitting units are turned on at the correct luminance values of the plurality of light-emitting units; and a first correction unit configured to perform a correction including comparing the estimation luminance and the requisite luminance and increasing the correct luminance value of the light-emitting unit corresponding to a region where the estimation luminance is smaller than the requisite luminance.

6. The display apparatus according to claim 1, wherein the first acquisition unit acquires the initial luminance value of each of the plurality of light-emitting units based on at least one of maximum gradation value, average gradation value, maximum luminance, and average luminance of each of the plurality of regions of the input image.

7. The display apparatus according to claim 1, further comprising:

a second acquisition unit configured to acquire a requisite luminance to display the input image;

an estimation unit configured to acquire an estimation luminance of the display unit in a case where the plurality of light-emitting units are turned on at the correct luminance values of the plurality of light-emitting units;

a third acquisition unit configured to acquire unevenness in the correct luminance values of the plurality of light-emitting units; and a correction unit configured to relatively increase the correct luminance values in a case where the unevenness is larger than a predetermined value.

8. The display apparatus according to claim 7, wherein the third acquisition unit acquires the unevenness in the correct luminance values based on at least one of a characteristic value indicating the luminance of the plurality of regions, the requisite luminance, the estimation luminance, and the correct luminance value.

9. The display apparatus according to claim 8, wherein the correction unit relatively increases the correct luminance value, in a case where a difference between a maximum value and an average value or a difference between a minimum value and the average value of at least one of the characteristic value, the requisite luminance, the estimation luminance, and the correct luminance value of the plurality of light-emitting units is greater than a first threshold value.

10. The display apparatus according to claim 8, wherein the correction unit relatively increases the correct luminance value, in a case where a dispersion value of at least one of the characteristic value, the requisite luminance, the estimation luminance, and the correct luminance value of the plurality of light-emitting units is greater than a second threshold value.

11. The display apparatus according to claim 8, wherein, in the case where a sum value of at least one of the characteristic value, the requisite luminance, the estimation luminance, and the correct luminance value of the plurality of light-emitting units is smaller than a third threshold value, the correction unit relatively increases the correct luminance value compared to a case where the sum value of the plurality of light-emitting units is not smaller than the third threshold value.

12. The display apparatus according to claim 7, wherein the correction unit relatively increases the correct emission luminance value corresponding to an external light source among the plurality of light-emitting units.

13. The display apparatus according to claim 1, further comprising:

an average acquisition unit configured to acquire an average picture level (APL) of the input image; and a correction unit configured to correct the correct luminance value, wherein in a case where the APL is lower than a predetermined threshold value, the correction unit increases the correct luminance value compared to a case where the APL is equal to or higher than the predetermined threshold.

14. The display apparatus according to claim 1, wherein the display unit includes a liquid crystal panel.

15. A display apparatus, comprising:

a plurality of light-emitting units respectively configured to emit light;

a display unit configured to display an image on a screen with transmitted light emitted based on an input image;

a first acquisition unit configured to acquire initial characteristic values indicating the luminance of a plurality of regions of the input image corresponding to the plurality of light-emitting units;

a first processing unit configured to acquire intermediate characteristic values of the plurality of regions by correcting the initial characteristic values of the plurality of regions, wherein the first processing unit increases an initial characteristic value of a first target region among the plurality of regions that is greater than an initial characteristic value of a first neighboring region neighboring the first target region, according to a difference of the initial characteristic value of the first target region and the initial characteristic value of the first neighboring region;

a second processing unit configured to acquire correct characteristic values of the plurality of regions by correcting the intermediate characteristic values of the plurality of regions, wherein the second processing unit increases an intermediate characteristic value of a second target region among the plurality of regions that is smaller than an intermediate characteristic value of a second neighboring region neighboring the second target region, according to a difference of the intermediate characteristic value of the second target region and the intermediate characteristic value of the second neighboring region, the second target region being same or different from the first target region; and a control unit configured to control light emission of each of the plurality of light-emitting units based on correct characteristic value of each of the plurality of regions.

16. A display apparatus comprising:

a plurality of light-emitting units respectively configured to emit light;

a display unit configured to display an image on a screen with transmitted light emitted based on an input image;

a first acquisition unit configured to acquire initial luminance values of each of the plurality of light-emitting units based on the luminance of each of a plurality of regions of the input image corresponding to each of the plurality of light-emitting units; and a control unit configured to control light emission of the plurality of light-emitting units based on correct luminance values of the plurality of light-emitting units, obtained by increasing the initial luminance value of a target light-emitting unit among the plurality of light-emitting units according to the difference between the initial luminance value of the target light-emitting unit and the initial luminance value of a neighboring light-emitting unit neighboring the target light-emitting unit.

17. The display apparatus according to claim 16, wherein, in a case of the initial luminance value of the target light-emitting unit is greater than the initial luminance value of the neighboring light-emitting unit, the control unit acquires the correct luminance value of the target light-emitting unit by increasing the initial luminance value of the target light-emitting unit according to the difference between the initial luminance value of the target light-emitting unit and the initial luminance value of the neighboring light-emitting unit, and wherein, in a case where the initial luminance value of the target light-emitting unit is smaller than the initial luminance value of the neighboring light-emitting unit, the control unit acquires the correct luminance value of the target light-emitting unit by increasing the initial luminance value of the target light-emitting unit according to the difference between the initial luminance value of the target light-emitting unit and the initial luminance value of the neighboring light-emitting unit.

18. A display apparatus, comprising:

a plurality of light-emitting units respectively configured to emit light;

a display unit configured to display an image on a screen with transmitted light emitted based on an input image;

a first acquisition unit configured to acquire initial characteristic values indicating the luminance of a plurality of regions of the input image corresponding to the plurality of light-emitting units; and a control unit configured to control light emission of the plurality of light-emitting units at emission luminance of the plurality of light-emitting units based on correct characteristic values of the plurality of regions obtained by increasing the initial characteristic value of a target region among the plurality of regions according to the difference between the initial characteristic value of the target region and the initial characteristic value of a neighboring region neighboring the target region.

19. A method for controlling a display apparatus that includes a plurality of light-emitting units configured to emit light, and a display unit configured to display an image on a screen with transmitted light emitted based on an input image, the method comprising:

first acquiring step configured to acquire initial luminance values of the plurality of light-emitting units based on the luminance of each of a plurality of regions of an input image corresponding to each of a plurality of light-emitting units;

second acquiring step configured to acquire intermediate luminance values of the plurality of light-emitting units by correcting the initial luminance values of the plurality of light-emitting units, wherein the first processing unit increases an initial luminance value of a first target light-emitting unit among the plurality of light-emitting units that is greater than an initial luminance value of a first neighboring light-emitting unit neighboring the first target light-emitting unit, according to a difference of the initial luminance value of the first target light-emitting unit and the initial luminance value of the first neighboring light-emitting unit;

third acquiring step configured to acquire correct luminance values of the plurality of light-emitting units by correcting the intermediate luminance values of the plurality of light-emitting units, wherein the second processing unit increases an intermediate luminance value of a second target light-emitting unit among the plurality of light-emitting units that is smaller than an intermediate luminance value of a second neighboring light-emitting unit neighboring the second target light-emitting unit, according to a difference of the intermediate luminance value of the second target light-emitting unit and the intermediate luminance value of the second neighboring light-emitting unit; and controlling step configured to control light emission of each of the plurality of light-emitting units according to the correct luminance value of each of the plurality of light-emitting units.

20. The method for controlling the display apparatus according to claim 19, wherein the second acquiring step includes acquiring the intermediate luminance values of the plurality of light-emitting units by performing filter calculation on a distribution of the initial luminance values of the plurality of light-emitting units in such a way as to emphasize high-frequency components of the distribution.

21. The method for controlling the display apparatus according to claim 19, wherein the second acquiring step includes acquiring the intermediate luminance value of the first target light-emitting unit by adding a value obtained by multiplying a predetermined coefficient with the initial luminance value of the first target light-emitting unit to the initial luminance value of the first neighboring light-emitting unit.

22. The method for controlling the display apparatus according to claim 19, wherein the second acquiring step includes not performing processing for estimating an irradiation luminance of the display unit when each light-emitting unit is turned on at the initial luminance value.

23. The method for controlling the display apparatus according to claim 19, wherein the third acquiring step includes acquiring the correct luminance value of the second target light-emitting unit by increasing the intermediate luminance value of the second target light-emitting unit according to the difference between the intermediate luminance value of the second target light-emitting unit and the highest luminance value among a plurality of the intermediate luminance values of a plurality of the second target light-emitting units.

24. A method for controlling a display apparatus that includes a plurality of light-emitting units configured to emit light and a display unit configured to display an image on a screen with transmitted light emitted based on an input image, the method comprising:

first acquiring step configured to acquire initial characteristic values indicating the luminance of a plurality of regions of the input image corresponding to the plurality of light-emitting units;

second acquiring step configured to acquire intermediate characteristic values of the plurality of regions by correcting the initial characteristic values of the plurality of regions;

third acquiring step configured to acquire correct characteristic values of the plurality of regions by correcting the intermediate characteristic values of the plurality of regions; and controlling step configured to control light emission of each of the plurality of light-emitting unit based on the correct characteristic values of each of the plurality of regions.

25. A method for controlling a display apparatus that includes a plurality of light-emitting units configured to emit light and a display unit configured to display an image on a screen with transmitted light emitted based on an input image, the method comprising:

acquiring step configured to acquire initial luminance values of each of the plurality of light-emitting units based on the luminance of each of a plurality of regions of the input image corresponding to each of the plurality of light-emitting units; and controlling step configured to control light emission of the plurality of light-emitting units based on correct luminance values of the plurality of light-emitting units, obtained by increasing the initial luminance value of a target light-emitting unit among the plurality of light-emitting units according to the difference between the initial luminance value of the target light-emitting unit and the initial luminance value of a neighboring light-emitting unit neighboring the target light-emitting unit.

26. The method for controlling the display apparatus according to claim 25, wherein the controlling step includes acquiring the correct luminance value of the target light-emitting unit by increasing the initial luminance value of the target light-emitting unit according to the difference between the initial luminance value of the target light-emitting unit and the initial luminance value of the neighboring light-emitting unit in a case of the initial luminance value of the target light-emitting unit is greater than the initial luminance value of the neighboring light-emitting unit, and acquiring the correct luminance value of the target light-emitting unit by increasing the initial luminance value of the target light-emitting unit according to the difference between the initial luminance value of the target light-emitting unit and the initial luminance value of the neighboring light-emitting unit in a case where the initial luminance value of the target light-emitting unit is smaller than the initial luminance value of the neighboring light-emitting unit.

27. A method for controlling a display apparatus that includes a plurality of light-emitting units respectively configured to emit light and a display unit configured to display an image on a screen with transmitted light emitted based on an input image, the method comprising:

acquiring step configured to acquire initial characteristic values indicating the brightness of a plurality of regions of the input image corresponding to the plurality of light-emitting units; and controlling step configured to control light emission of the plurality of light-emitting units at emission luminance of the plurality of light-emitting units based on correct characteristic values of the plurality of regions obtained by increasing the initial characteristic value of a target region among the plurality of regions according to the difference between the initial characteristic value of the target region and the initial characteristic value of a neighboring region neighboring the target region.

28. A computer readable storage medium storing a program that causes a computer to perform each processing of the method for controlling the display apparatus according to claim 19.

* * * * *